US010378580B2

(12) United States Patent
Hayashi et al.

(10) Patent No.: US 10,378,580 B2
(45) Date of Patent: Aug. 13, 2019

(54) TAPERED ROLLER BEARING

(71) Applicant: NTN CORPORATION, Osaka (JP)

(72) Inventors: Yasuyoshi Hayashi, Mie (JP); Takashi Wakisaka, Mie (JP)

(73) Assignee: NTN CORPORATION, Osaka (JP)

( * ) Notice: Subject to any disclaimer, the term of this patent is extended or adjusted under 35 U.S.C. 154(b) by 5 days.

(21) Appl. No.: 15/565,676

(22) PCT Filed: Apr. 8, 2016

(86) PCT No.: PCT/JP2016/061575
§ 371 (c)(1),
(2) Date: Oct. 10, 2017

(87) PCT Pub. No.: WO2016/163527
PCT Pub. Date: Oct. 13, 2016

(65) Prior Publication Data
US 2018/0119735 A1 May 3, 2018

(30) Foreign Application Priority Data

Apr. 10, 2015 (JP) .................................. 2015-081122
Apr. 10, 2015 (JP) .................................. 2015-081132
(Continued)

(51) Int. Cl.
F16C 33/46 (2006.01)
F16C 19/36 (2006.01)
F16C 33/66 (2006.01)

(52) U.S. Cl.
CPC ........ F16C 19/364 (2013.01); F16C 33/4635 (2013.01); F16C 33/4676 (2013.01);
(Continued)

(58) Field of Classification Search
CPC ......................... F16C 33/4635; F16C 33/4676
See application file for complete search history.

(56) References Cited

U.S. PATENT DOCUMENTS 4,707,152 A * 11/1987 Neese .................. F16C 19/364
384/572
9,039,288 B2 * 5/2015 Takeuchi ............ F16C 33/4635
384/572
(Continued)

FOREIGN PATENT DOCUMENTS

CN 104105893 A 10/2014
CN 105143697 A 12/2015
(Continued)

OTHER PUBLICATIONS

International Search Report for PCT/JP2016/061575 dated Jun. 28, 2016.
(Continued)

Primary Examiner — Thomas R Hannon
(74) Attorney, Agent, or Firm — Hedman & Costigan, P.C.; James V. Costigan; Kathleen A. Costigan

(57) ABSTRACT

To provide a tapered roller bearing provided with a retainer formed of resin capable of being molded by using a simple molding die, and capable of retaining a tapered roller stably when the tapered roller and the retainer are integrated, and capable of improving mechanical strength and lubricating performance on a guide surface as needed. A retainer 5 in the tapered roller bearing is formed of an injection molded body formed by injection molding a resin composition. The retainer 5 includes a large diameter ring portion 5a, a small diameter ring portion 5b, and a column portion 5c which joins both of them. A pocket portion 6 is formed between the column portions adjacent to each other. An injection molding die dividing line X along an axial direction is formed on the column portion 5c. A guide portion 5d for a tapered roller 4 formed of a surface, which narrows a width of an opening of the pocket portion in a circumferential direction, is arranged on the column portion 5c at a small diameter side with respect to the dividing line X and an outer diameter side (Continued)

of the retainer. A claw portion 5*e* for drop-off of the tapered roller 4 is arranged on the column portion 5*c* at a small diameter side with respect to the dividing line X and an inner diameter side of the retainer.

9 Claims, 16 Drawing Sheets

(30) Foreign Application Priority Data

| Jun. 16, 2015 | (JP) | 2015-121277 |
|---|---|---|
| Aug. 21, 2015 | (JP) | 2015-163348 |

(52) U.S. Cl.
CPC ...... *F16C 33/6681* (2013.01); *F16C 2322/59* (2013.01); *F16C 2361/61* (2013.01)

(56) References Cited

U.S. PATENT DOCUMENTS

| 9,140,303 B2 * | 9/2015 | Dittmar | F16C 33/4635 |
|---|---|---|---|
| 2016/0040716 A1 | 2/2016 | Koganei | |

FOREIGN PATENT DOCUMENTS

| CN | 103827528 B | 7/2017 |
|---|---|---|
| DE | 212013000259 U1 | 7/2015 |
| EP | 2982878 A1 | 2/2016 |
| JP | 58-155424 U | 10/1983 |
| JP | 59-050224 A | 3/1984 |
| JP | 61-49128 U | 4/1986 |
| JP | 11-044322 A | 2/1999 |
| JP | 2007-032679 A | 2/2007 |
| JP | 2007-127167 A | 5/2007 |
| JP | 2009-209952 A | 9/2009 |
| JP | 2011-247358 A | 12/2011 |
| JP | 2012-167695 A | 9/2012 |
| JP | 2013-174254 A | 9/2013 |
| JP | 2014-139474 A | 7/2014 |
| JP | 2014-202284 A | 10/2014 |
| JP | 2014-211230 A | 11/2014 |
| WO | 2013/042703 A1 | 3/2013 |
| WO | 2014/098212 A1 | 6/2014 |
| WO | 2014/163177 A1 | 10/2014 |

OTHER PUBLICATIONS

English Abstract for JP 2014-202284 A dated Oct. 27, 2014.
English Abstract for JP 2007-032679 A dated Feb. 8, 2007.
English Abstract for JP 2013-174254 A dated Sep. 5, 2013.
English Abstract for JP 2007-127167 A dated May 24, 2007.
English Abstract for JP 2014-211230 A dated Nov. 13, 2014.
English Abstract for CN 105143697 A dated Dec. 9, 2015.
English Claims for JP 58-155424 U dated Oct. 17, 1983.
English Abstract for JP 2011-247358 A dated Dec. 8, 2011.
English Claims for JP 61-49128 U dated Apr. 2, 1986.
English Abstract for JP 2014-139474 A dated Jul. 31, 2014.
English Machine Translation of Abstract for DE 212013000259 U1 dated Jul. 24, 2015.
English Abstract for CN 104105893 A dated Oct. 15, 2014.
English Abstract for JP 2012-167695 dated Sep. 6, 2012.
English Abstract for JP 2009-209952 dated Sep. 17, 2009.
English Abstract for CN 103827528 dated Jul. 21, 2017.
English Abstract for JP 11-044322 dated Feb. 16, 1999.
English Abstract for JP 59-050224 dated Mar. 23, 1984.

* cited by examiner (a)

TAPERED ROLLER BEARING

TECHNICAL FIELD

The present invention relates to a tapered roller bearing used in an industrial robot or a speed reduction machine of a construction machine. In particular, the present invention relates to a tapered roller bearing having a shape without a small flange on an inner ring and having a construction in which a tapered roller and a retainer are integrated in order to prevent the tapered roller from dropping off.

BACKGROUND ART

In a use in which rigidity is required against a moment load, such as a rolling bearing used in an industrial robot, an angular ball bearing or a tapered roller bearing is generally pressurized to use. In a case in which high rigidity is required, the tapered rolling bearing having a large load capacity in the same size is rather used. In recent years, the moment load against a size of the bearing becomes larger, and therefore necessary rigidity has been increased. Further, a space for the bearing becomes smaller due to miniaturization of a whole of an apparatus. That is, a tapered roller bearing having a small size and a high load capacity is desired.

A general tapered rolling bearing according to a conventional technique is described with reference to FIG. 5. As shown in FIG. 5, a tapered roller bearing 11 is provided with an inner ring 12 having a tapered raceway surface 12a on an outer circumference surface, an outer ring 13 having tapered raceway surface 13a on an inner circumferential surface, a plurality of tapered rollers 14 which rolls between the raceway surface 12a of the inner ring 12 and the raceway surface 13a of the outer ring 13, and a retainer 15 which retains each tapered rollers 14 in each pocket portion in a rolling manner. The retainer 15 is formed by joining a large diameter ring portion 15a and a small diameter ring portion 15b by a plurality of column portions 15c. The retainer 15 houses the tapered roller 14 in a pocket portion 16 between the column portions 15c adjacent to each other. A large flange 12b is integrally formed on a large diameter side end portion of the inner ring 12 and a small flange 12c is integrally formed on a small diameter side end portion of the inner ring 12, and thereby the tapered roller 14 and the retainer 15 are prevented from dropping off from the inner ring 12. The inner ring in the tapered roller bearing has the tapered raceway surface, and thereby the inner ring includes a small side and a large side when seen from an axial direction. "The small flange" is a flange arranged on the small diameter side end portion, and "the large flange" is a flange arranged on the large diameter side end portion.

Relating to such a tapered roller bearing, in Patent Document 1, a construction in which the raceway surface of the inner ring is continued until the small diameter side end portion of the inner ring and thereby the raceway surface is ensured, is proposed. Patent Document 1 discloses that the tapered roller, the inner ring, and the retainer are separated by continuing the raceway surface of the inner ring until the small diameter side end portion, however the tapered roller and the retainer can be integrated by modifying a shape of the retainer. Further, in Patent Document 1 and Patent Document 2, as a manufacturing method of the retainer in which the tapered roller and the retainer are integrated, it is disclosed that the retainer is formed by means of injection molding by using two molding dies in an axial direction (axial draw).

The retainer in the tapered roller bearing according to Patent Document 1 is described with reference to FIG. 6. As shown in FIG. 6, a retainer 21 is formed to retain a tapered roller (not shown) in a pocket portion 22. In order to prevent the tapered roller from dropping off from the pocket portion 22 in assembling, tapered surfaces 24, 25 are formed at an inner diameter side and an outer diameter side of a column portion 23, respectively. The tapered surface 24 at the inner diameter side and the tapered surface 25 at the outer diameter side are diagonally arranged to each other on one surface of the column portion 23. Further, a groove 26 is formed along a molding die dividing line, and thereby even if a burr is generated between the molding dies after molding, the interruption of the burr against the tapered roller is prevented.

PRIOR ART DOCUMENTS

Patent Documents

Patent Document 1: JP 2014-202284 A
Patent Document 2: WO 2014/163177 A

SUMMARY OF THE INVENTION

Problems to be Solved by the Invention

However, in a case in which parts (the tapered surface at the inner diameter side and the tapered surface at the outer diameter side) to be a hooking margin when the tapered roller and the retainer are integrated are diagonally arranged as disclosed in Patent Document 1, a molding die dividing surface might be complicated. Further, the tapered surface 24 at the inner diameter side and the tapered surface 25 at the inner diameter side to be the hooking margin for the tapered roller are diagonally arranged, and in association with that, an outer diameter side surface of the tapered surface 24 and an inner diameter side surface 25 of the tapered surface 25, which are surfaces without the hooking margin for the tapered roller, are also diagonally arranged, and thereby retaining performance of the tapered roller might not be sufficient because the tapered roller is deviated when the tapered roller is retained. Further, in a case in which the groove 26 is arranged on the molding die dividing surface, a column portion becomes thin in association with that, and thereby mechanical strength of the column portion might be decreased. Especially, in a case in which a filling rate of the tapered roller is made high in order for a high load capacity configuration, the column portion becomes thin against a diameter of the retainer and thereby ring rigidity of a whole of the retainer might be decreased. Further, in a case in which a guide surface to be a contact surface with the tapered roller is made large in order to retain the tapered roller stably, the actual contact area becomes large and a lubricant is hardly entered into the contact surface, and thereby lubricating performance might be deteriorated.

An object of the present invention is, in order to solve the problems described above, to provide a tapered roller bearing provided with a retainer formed of resin capable of being molded by using a simple molding die, and capable of retaining a tapered roller stably when the tapered roller and the retainer are integrated, and capable of improving mechanical strength and lubricating performance on a guide surface as needed.

Means for Solving the Problem

A tapered roller bearing according to the present invention includes an inner ring having a tapered raceway surface on an outer circumferential surface, an outer ring having a tapered raceway surface on an inner circumferential surface, a plurality of tapered rollers which rolls between the raceway surface of the inner ring and the raceway surface of the outer ring, and a retainer which retains the tapered rollers in a pocket portion in a rolling manner. The retainer is formed of an injection molded body formed by injection molding a resin composition. The retainer includes (A) a large diameter ring portion, a small diameter ring portion, and column portions, each of which joins the large diameter ring portion and the small diameter ring portion, the pocket portion being arranged between the column portions adjacent to each other, or (B) column portions, a ring portion arranged at one of a small diameter side and a large diameter side of the retainer to support the column portions at the same intervals in a circumferential direction, the pocket portion being arranged between the column portions adjacent to each other, and a protrusion arranged at an end portion opposite to a side of the ring portion of the column portion and protruded toward a side of the pocket portion to support one end surface of the tapered roller. The retainer includes (1) a molding die dividing line along an axial direction on the column portion due to the injection molding, a guide portion for the tapered roller formed of a surface, which narrows a width in a circumferential direction of an opening of the pocket portion, and arranged at a small diameter side with respect to the molding die dividing line of the column portion and at an outer diameter side of the retainer, and a claw portion for drop-off prevention of the tapered roller, arranged at the small diameter side with respect to the molding die dividing line of the column portion and at an inner diameter side of the retainer, or (2) a molding die dividing line along an axial direction on the column portion due to the injection molding, a guide portion for the tapered roller formed of a surface, which narrows a width in a circumferential direction of an opening of the pocket portion, and arranged at a large diameter side with respect to the molding die dividing line of the column portion and at an inner diameter side of the retainer, and a claw portion for drop-off prevention of the tapered roller, arranged at the large diameter side with respect to the molding die dividing line of the column portion and at an outer diameter side of the retainer.

The retainer fulfills the feature (B) described above, and the ring portion is arranged at the large diameter side of the retainer. This is a construction in which the ring portion at the small diameter side is omitted.

The inner ring has a construction without a small flange at a small diameter side end portion or a construction without a small flange at a small diameter side end portion and without a large flange at a large diameter side end portion.

A width of the guide portion in a taper direction is equal to or more than 51% of a width of the column portion in the taper direction.

The guide portion and the claw portion for the drop-off prevention are formed by the same molding die, and the claw portion is formed through forced extraction.

A height h of the claw portion is set against a width $t_1$ of the claw portion in a taper direction of the column portion such that $h/t_1$ is equal to or more than 0.02, and the height h of the claw portion is set against a width $t_2$ of the claw portion in an axial direction of the retainer such that $h/t_2$ is equal to or more than 0.02.

The guide portion includes a groove which penetrates both end portions of the guide portion in an axial direction. Further, the retainer fulfills the feature (1) described above, and the groove is formed such that a width of the groove is increased from an end portion in an axial direction at an outer diameter side of the retainer toward an opposite end portion in the axial direction, or the retainer fulfills the feature (2) described above, and the groove is formed such that a width of the groove is decreased from an end portion in an axial direction at an inner diameter side of the retainer toward an opposite end portion in the axial direction.

Effects of the Invention

The tapered roller bearing according to the present invention in which the retainer fulfills the features (A) and (1) includes the molding die dividing line along the axial direction on the column portion of the retainer formed of an injection molded body, the guide portion for the tapered roller arranged at the small diameter side with respect to the molding die dividing line of the column portion and at the outer diameter side of the retainer, and the claw portion for the drop-off prevention of the tapered roller arranged at the small diameter side with respect to the molding die dividing line of the column portion and at the inner diameter side of the retainer, and therefore the guide portion at the outer diameter side and the claw portion at the inner diameter side are arranged at the small diameter side, and thereby excellent holding performance of the tapered roller can be obtained. Further, in molding using two molding dies of axial draw, the guide portion and the claw portion for the drop-off prevention can be molded by the same side molding die, and thereby a structure of the molding die can be simplified. Further, the tapered roller and the retainer can be integrated by the claw portion for the drop-off prevention, and thereby a construction without a small flange can be adopted and an increase of a load capacity and miniaturization can be achieved by extending a length of the tapered roller.

The tapered roller bearing according to the present invention in which the retainer fulfills the features (A) and (2) includes the molding die dividing line along the axial direction on the column portion of the retainer formed of an injection molded body, the guide portion of the tapered roller arranged at the large diameter side with respect to the molding die dividing line of the column portion and at the inner diameter side of the retainer, and the claw portion for the drop-off prevention of the tapered roller arranged at the large diameter side with respect to the molding die dividing line of the column portion and at the outer diameter side of the retainer, and therefore the guide portion at the inner diameter side and the claw portion at the outer diameter side are arranged at the small diameter side with respect to the molding die dividing line, and thereby excellent holding performance of the tapered roller can be obtained. Further, in molding using two molding dies of axial draw, the guide portion and the claw portion for the drop-off prevention are molded by the same side molding die, and thereby a structure of the molding die can be simplified. Further, the tapered roller and the retainer can be integrated by the claw portion for the drop-off prevention, and thereby a construction without a small flange can be adopted and an increase of a load capacity and miniaturization can be achieved by extending a length of the tapered roller.

The tapered roller bearing according to the present invention in which the retainer fulfills the feature (B) includes column portions, a ring portion arranged at one of a small diameter side and a large diameter side of the retainer to support the column portions at the same intervals in a circumferential direction, the pocket portion being arranged between the column portions adjacent to each other, and a protrusion arranged at an end portion opposite to a side of the ring portion of the column portion and protruded toward a side of the pocket portion to support one end surface of the tapered roller, and therefore the drop-off of the tapered roller from the retainer can be prevented with a construction in which one of the rings is omitted. Further, a length in the axial direction of the retainer or a length in the axial direction of a whole of the tapered roller bearing can be shortened.

Especially, in the retainer described above, the ring portion is arranged at the large diameter side of the retainer and the ring portion at the small diameter side is omitted, and thereby a drawing amount of the retainer from an outer ring end surface can be expanded largely. Further, it is not necessary to forcibly narrow a width of the large flange of the inner ring, and thereby deterioration of the strength can be prevented. Further, a width of the inner ring can be made small.

The column portion includes the guide portion of the tapered roller formed of the surface which narrows the width in the circumferential direction of the opening of the pocket portion and the claw portion for the drop-off prevention of the tapered roller, and thereby the tapered roller and the retainer can be integrated without the small diameter ring portion by using the guide portion, the claw portion, and the protrusion described above. With this, a construction without a small flange can be adopted and an increase of a load capacity and miniaturization can be achieved by extending a length of the tapered roller.

The retainer is formed of the injection molded body of a resin composition, and thereby the guide portion, the claw portion, and the protrusion having specific shapes described above can be formed integrally with a retainer body easily. Further, the guide portion and the claw portion arranged at the same side (the small diameter side or the large diameter side) with respect to the molding die dividing line of the column portion in the injection molding, and thereby the guide portion and the claw portion can be molded by the same side molding die in molding using the two molding dies of the axial draw, and a construction of the molding die can be simplified.

The width of the guide portion in the taper direction is equal to or more than 51% of the width of the column portion in the taper direction, and thereby in a case in which the retainer fulfills the feature (1), the molding die dividing line is shifted to the large diameter side with respect to the center of the column portion of the retainer, and in a case in which the retainer fulfills the feature (2), the molding die dividing line is shifted to the small diameter side with respect to the center of the column of the retainer, and therefore the tapered roller can be retained further stably.

The height h of the claw portion is set against the width $t_1$ of the claw portion in the taper direction of the column portion such that $h/t_1$ is equal to or more than 0.02, and the height h of the claw portion is set against the width $t_2$ of the claw portion in an axial direction of the retainer such that $h/t_2$ is equal to or more than 0.02, and thereby when the claw portion is formed through the forced extraction, a crack or whitening of the claw portion can be prevented.

The guide portion includes the groove which penetrates the both end portions of the guide portion in the axial direction, and thereby lubricating performance on a guide surface of the guide portion can be improved.

MODE FOR CARRYING OUT THE INVENTION

Figure 1:
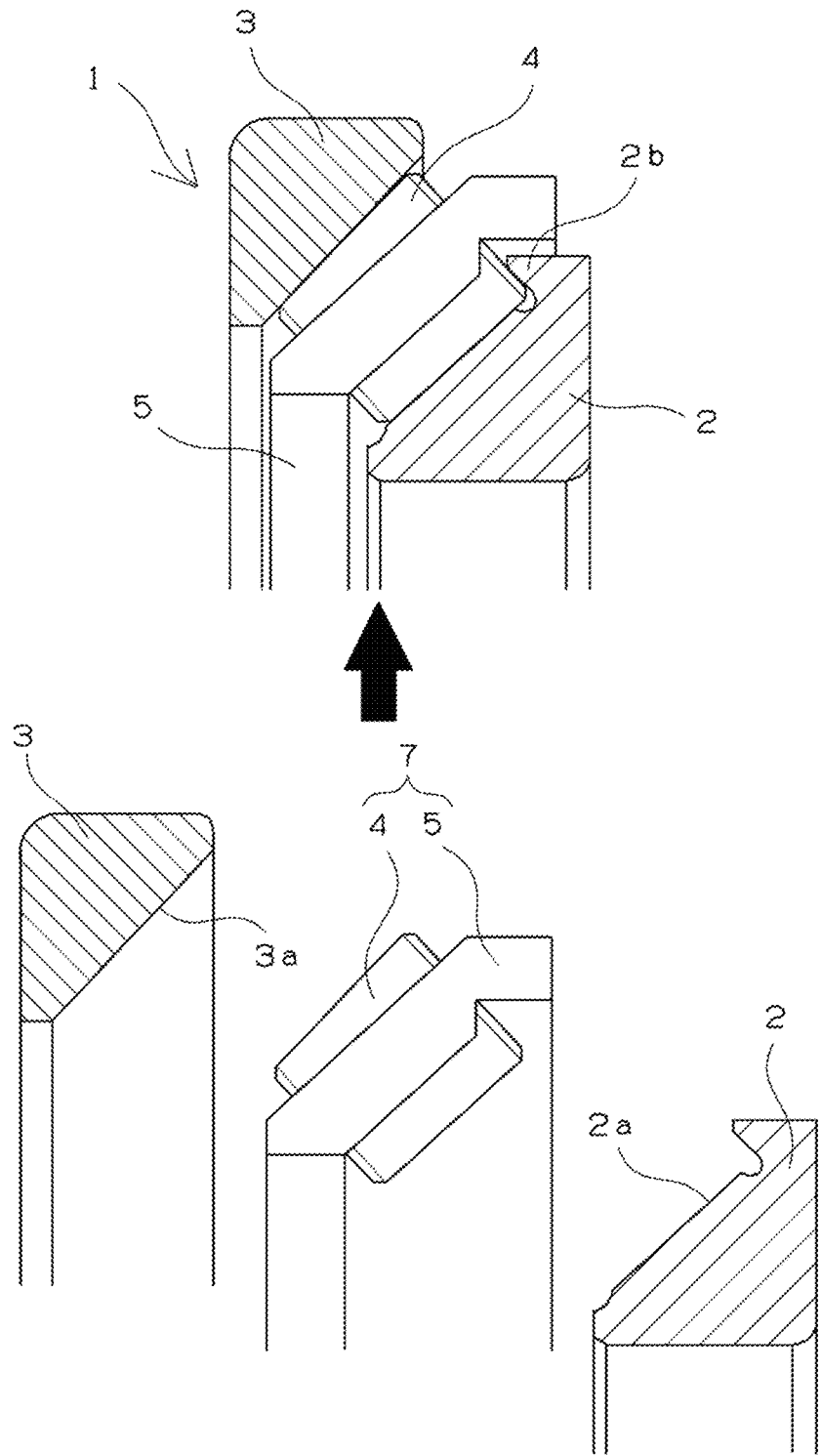
FIG. 1 is a view illustrating one example of a tapered roller bearing according to the present invention.

A tapered roller bearing according to the present invention includes an inner ring having a tapered raceway surface on an outer circumferential surface, an outer ring having a tapered raceway surface on an inner circumferential surface, a plurality of tapered rollers which rolls between the raceway surface of the inner ring and the raceway surface of the outer ring, and a retainer which retains the tapered rollers in a pocket portion in a rolling manner.

The retainer is formed of an injection molded body formed by injection molding a resin composition.

The retainer includes:

(A) a large diameter ring portion, a small diameter ring portion, and column portions, each of which joins the large diameter ring portion and the small diameter ring portion, the pocket portion being arranged between the column portions adjacent to each other, or (B) column portions, a ring portion arranged at one of a small diameter side and a large diameter side of the retainer to support the column portions at the same intervals in a circumferential direction, the pocket portion being arranged between the column portions adjacent to each other, and a protrusion arranged at an end portion opposite to a side of the ring portion of the column portion and protruded toward a side of the pocket portion to support one end surface of the tapered roller.

The retainer includes:

(1) a molding die dividing line along an axial direction on the column portion due to the injection molding, a guide portion for the tapered roller formed of a surface, which narrows a width in a circumferential direction of an opening of the pocket portion, and arranged at a small diameter side with respect to the molding die dividing line of the column portion and at an outer diameter side of the retainer, and a claw portion for drop-off prevention of the tapered roller arranged at the small diameter side with respect to the molding die dividing line of the column portion and at an inner diameter side of the retainer, or (2) a molding die dividing line along an axial direction on the column portion due to the injection molding, a guide portion of the tapered roller formed of a surface, which narrows a width in a circumferential direction of an opening of the pocket portion, and arranged at a large diameter side with respect to the molding die dividing line of the column portion and at an inner diameter side of the retainer, and a claw portion for drop-off prevention of the tapered roller arranged at the large diameter side with respect to the molding die dividing line of the column portion and at an outer diameter side of the retainer.

One example of a tapered roller bearing according to the present invention in which the retainer fulfills the features (A) and (1) is described with reference to FIG. 1 and FIGS. 2(a) and 2(b). In the description below, the tapered roller bearing according to the present invention denotes the tapered roller bearing according to the present invention in which the retainer fulfills the features (A) and (1).

FIG. 1 is an axial cross-sectional view of the tapered roller bearing without an inner ring small flange and an exploded view thereof. FIG. 2(a) is an axial cross-sectional view of the retainer, and FIG. 2(b) is a cross-sectional view of the retainer along an axis of a tapered roller. As shown in FIG. 1, a tapered roller bearing 1 includes an inner ring 2 having a tapered raceway surface 2a on an outer circumferential surface, an outer ring 3 having a tapered raceway surface 3a on an inner circumferential surface, a plurality of tapered rollers 4 which rolls between the raceway surface 2a of the inner ring 2 and the raceway surface 3a of the outer ring 3, and a retainer 5 which retains the tapered rollers 4 in a rolling manner in a pocket portion at the same intervals in a circumferential direction. Each of the raceway surfaces is formed in a tapered shape in which a diameter formed by each of the raceway surfaces is increased or decreased along an axial direction. An angle of the taper is not especially limited, however the angle is normally set in a range between 15° and 60° against the axial direction. In the tapered roller bearing 1, a small flange is not arranged on a small diameter side end portion of the inner ring 2, and a large flange 2b is integrally formed on a large diameter side end portion of the inner ring 2. Here, the tapered roller bearing according to the present invention has a construction in which at least the small flange is omitted, and therefore a construction in which both of the small flange and the large flange are omitted may be adopted as needed.

As shown in the exploded view in FIG. 1, the tapered roller bearing 1 is used by being assembled in a target portion after combining an integrated member 7 in which the retainer 5 and the tapered roller 4 are integrated, and the inner ring 2 and the outer ring 3. When the retainer and the tapered roller are integrated to form the integrated member, a roller drop-off prevention mechanism is necessary to prevent the tapered roller 4 from dropping off from the retainer 5 (to keep the integrated state) in assembling as described above. In the tapered roller bearing according to the present invention, a claw portion for drop-off prevention of the tapered roller is arranged in a pocket portion of the retainer, and the tapered roller is assembled in the pocket portion through elastic deformation of the claw portion and thereby integrated with the retainer.

Figure 2:
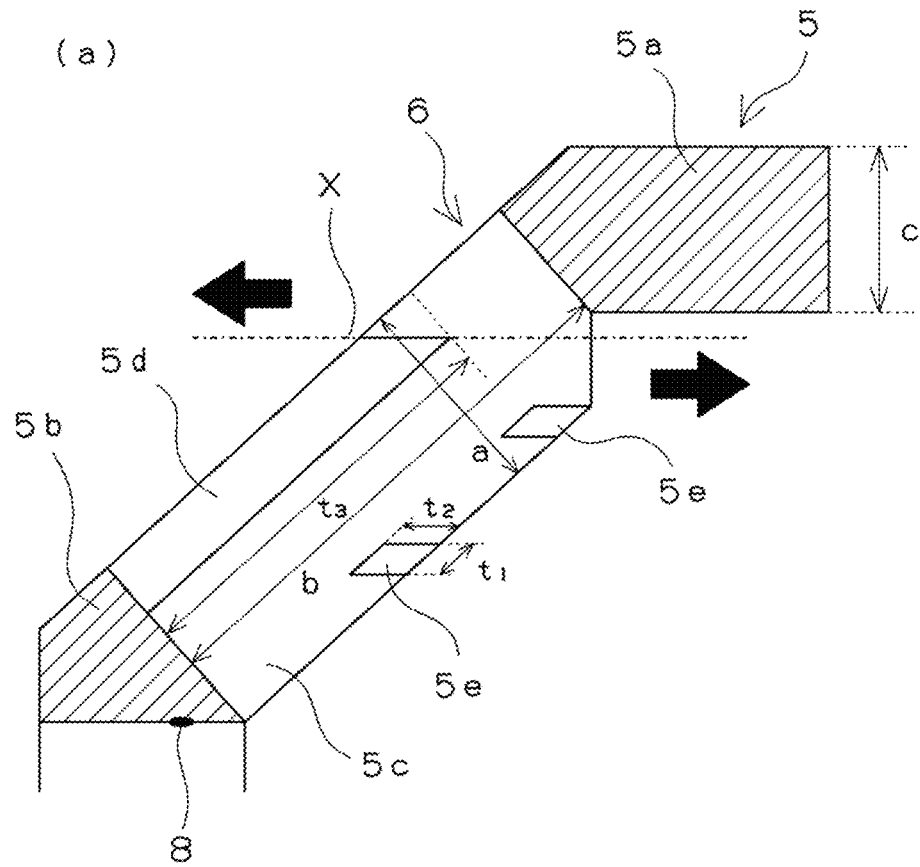
FIGS. 2(a) and 2(b) are cross-sectional views of a retainer in FIG. 1.
Figure 2:
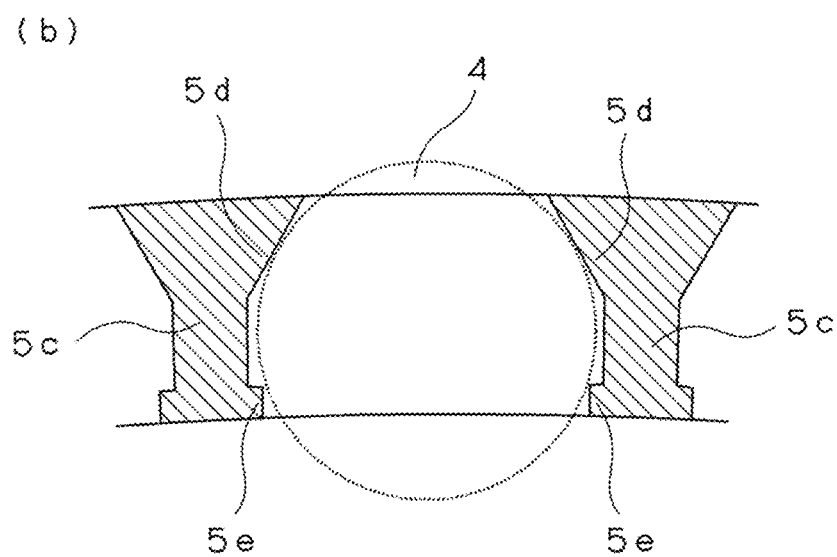

As shown in FIG. 2(a) and FIG. 2(b), the retainer 5 is formed by joining a large diameter ring portion 5a and a small diameter ring portion 5b, which are formed as rib portions, by a plurality of column portions 5c. The retainer 5 houses the tapered roller 4 in a pocket portion 6 between the column portions 5c. The retainer 5 is formed of an injection molded body formed by injection molding a resin composition described below. Here, a molding die dividing line X along an axial direction of the retainer (which is also an axial direction of the bearing) due to the injection molding is formed on the column portion 5c. The molding die dividing line X is shifted toward a large diameter side from the center of the column portion 5c. The injection molding die is formed of two molding dies of axial draw, and one is a molding die at the large diameter side (upper side in figure) with respect to the molding die dividing line X and another one is a molding die at a small diameter side (lower side in figure) with respect to the molding die dividing line X. One of the molding dies is a fixed molding die and another one is a movable molding die. As shown by black arrows in the figure, the molding die at the large diameter side (the upper side in the figure) with respect to the molding die dividing line X is relatively moved toward a left direction in the figure, and the molding die at the small diameter side (the lower side in the figure) with respect to the molding die dividing line X is relatively moved toward a right direction in the figure. The molding die dividing line X can be set in any position between the large diameter ring portion 5a and the small diameter ring portion 5b so as not to cross the ring portions.

The retainer 5 includes a guide portion 5d for the tapered roller at the small diameter side with respect to the molding die dividing line X of the column portion 5c and at an outer diameter side of the retainer, and a claw portion 5e for the drop-off prevention of the tapered roller at the small diameter side with respect to the molding die dividing line X of the column portion 5c and at an inner diameter side of the retainer. As shown in FIG. 2(b), the guide portion 5d is formed of a surface (guide surface) which narrows a width in a circumferential direction of an opening of the pocket portion. The tapered roller 4 rolls while contacting with a part of the guide surface of the guide portion 5d when driven. The guide surface may be formed in a curved surface along the tapered roller or a flat surface (straight surface). Further, the guide portion 5d forms a tapered opening along a generating line of the tapered roller when seen from a surface side of the opening of the pocket portion.

The guide portion 5d can prevent the tapered roller 4 from dropping off from the retainer 5 at a side where the guide portion 5d is formed. The tapered roller 4 is inserted (fitted) into the pocket portion 6 of the retainer 5 from the inner diameter side of the retainer 5 while deforming the claw portion 5e by a hooking margin, and thereby the tapered roller 4 is surrounded by the guide portion 5d and the claw portion 5e in the pocket portion 6 and retained.

It is preferable that a width $t_3$ of the guide portion 5d in a taper direction is set to be equal to or more than 51% of a width b of the column portion 5c in the taper direction (a width of the pocket portion). With this, the tapered roller can be retained further stably. The width $t_3$ is set to be preferably equal to or more than 55%, more preferably equal to or more than 60%, and most preferably equal to or more than 65%. In a configuration shown in FIG. 2(a), the guide portion 5d is continuously formed from the small diameter ring portion 5b to right before the molding die dividing line X. With such a configuration, the width $t_3$ can be ensured as long as possible while arranging the guide portion 5d at the small diameter side with respect to the molding die dividing line X.

The claw portion 5e may be arranged in any position at the small diameter side with respect to the molding die dividing line X and the inner diameter side of the retainer. It is preferable that the claw portion 5e is arranged at a position which facilitates the retaining of the tapered roller in relation with the position of the guide portion 5d. In the configuration shown in FIG. 2(a), two claw portions 5e having the same shape are separately arranged to be close to the molding die dividing line X in a range of the width in the taper direction of the guide portion 5d. The number of the claw portions is not limited to this, and the number of the claw portions is at least one, and therefore more than three claw portions may be arranged in order to retain the tapered roller stably.

As described above, both of the guide portion 5d and the claw portion 5e are arranged at the small diameter side with respect to the molding die dividing line X, and thereby the guide portion 5d and the claw portion 5e are formed by the same side molding die. The claw portion 5e is formed by the molding die which forms the guide portion 5d, and at this time, the claw portion 5e is formed through forced extraction. In this case, stress is generated on the claw portion, and therefore a break of a distal end (crack) or whitening of a proximal end might be generated. In a case in which a height of the claw portion is defined as h, a width of the claw portion in the taper direction of the column portion is defined as $t_1$, and a width of the claw portion in the axial direction of the retainer is defined as $t_2$ (see FIG. 2(a)), an analysis result of a relationship between these values and the crack and the whitening in the forced extraction of the injection molding is shown in Table 1. Here, the material of the retainer is PA66 resin (30 vol. % of glass fiber is compounded), and in the table, "○" denotes a case in which the crack and the whitening are not generated, "Δ" denotes a case in which the crack is not generated while the whitening is generated, and "x" denotes a case in which the crack is generated.

TABLE 1

|  |  | $h/t_1$ | | | | |
|---|---|---|---|---|---|---|
|  |  | 0.01 | 0.02 | 0.03 | 0.04 | 0.1 |
| $h/t_2$ | 0.01 | x (crack) | x (crack) | x (crack) | Δ (whitening) | Δ (whitening) |
|  | 0.02 | Δ (whitening) | ○ | ○ | ○ | ○ |
|  | 0.03 | Δ (whitening) | ○ | ○ | ○ | ○ |
|  | 0.04 | Δ (whitening) | ○ | ○ | ○ | ○ |
|  | 0.05 | Δ (whitening) | ○ | ○ | ○ | ○ |

As shown in Table 1, in a case in which the height h of the claw portion is set against the width $t_1$ of the claw portion in the taper direction of the column portion such that $h/t_1$ is equal to or more than 0.02, and the height h of the claw portion is set against the width $t_2$ of the claw portion in the axial direction of the retainer such that $h/t_2$ is equal to or more than 0.02, it is found that generation of the crack and the whitening when the forced extraction in the injection molding can be prevented.

Further, it is preferable that the distal end of the claw portion 5e in a thickness direction is formed in an R-shape. With this, the crack and the whitening can be further prevented. Further, a burr is hardly generated. An analysis result of a relationship between the radius R, the height h of the claw portion, and the crack and the whitening when the forced extraction in the injection molding, and the retaining performance of the tapered roller is shown in Table 2. Here, in the table, "○" denotes a case in which there is no problem in the retaining performance and in the injection molding, "Δ" denotes a case in which the injection molding is enabled while the whitening is generated, and "-" denotes a case in which the analysis is not done.

TABLE 2

| R/h | 0.2 | 0.5 | 1 | 1.5 | 2 |
|---|---|---|---|---|---|
| state of claw portion | x (crack) | ○ | ○ | ○ | ○ |
| retaining performance of roller | — | ○ | ○ | ○ | Δ (whitening) |

As shown in Table 2, in a case in which the radius R of the R-shape of the distal end is set in a range between 0.5 h and 1.5 h against the height h of the claw portion, the crack and the whitening when the force extraction in the injection molding can be prevented and excellent retaining performance of the tapered roller can be obtained.

Next, a measure of improving mechanical strength of the retainer is described. As shown in FIG. 2(a), as a thickness of the large diameter ring portion 5a is defined as c and a wall thickness of the column portion is defined as a, it is preferable that c against a is set in a range between 81% and 120%. With such a dimensional relation, the ring rigidity of the retainer can be improved. More preferably, c against a is set in a range between 84% and 100%.

Figure 3:
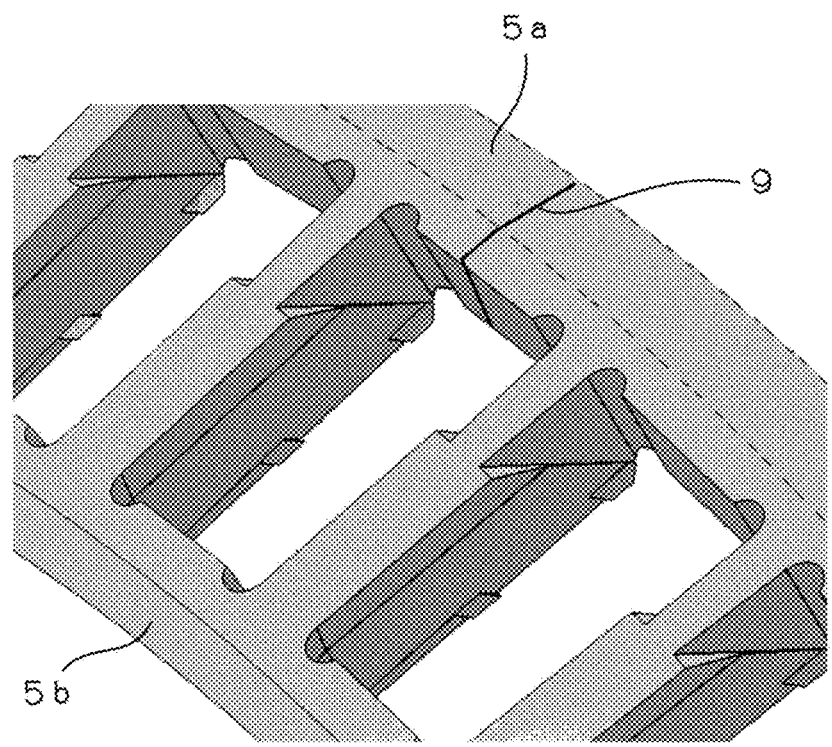
FIG. 3 is a perspective view of a part of the retainer illustrating a welding position.

Further, as shown in FIG. 2(a), it is preferable that a gate 8, which is an insertion port of resin in the injection molding, is arranged at the inner diameter side of the small diameter ring portion 5b. With this, as shown in FIG. 3, a welding position 9 can be set between the column portions of the large diameter ring portion 5a, and therefore deterioration of the strength of the retainer can be suppressed. Further, in a case in which the gate is arranged on the small diameter ring portion 5b, it is preferable that a wall thickness of the small diameter ring portion 5b is set to be 1.6 times through 4 times as large as a diameter of the gate. With this, the molding can be performed while avoiding a short shot.

Figure 4:
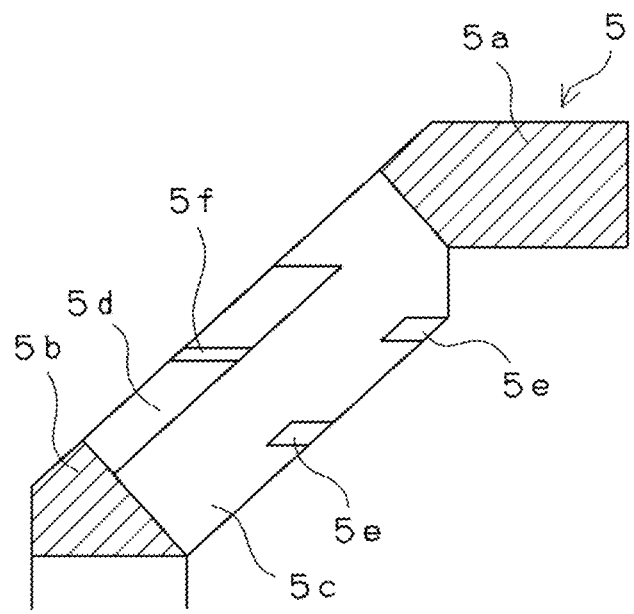
FIGS. 4(a) and 4(b) are axial cross-sectional views of the retainer illustrating a configuration of a groove of a guide portion.
Figure 4:
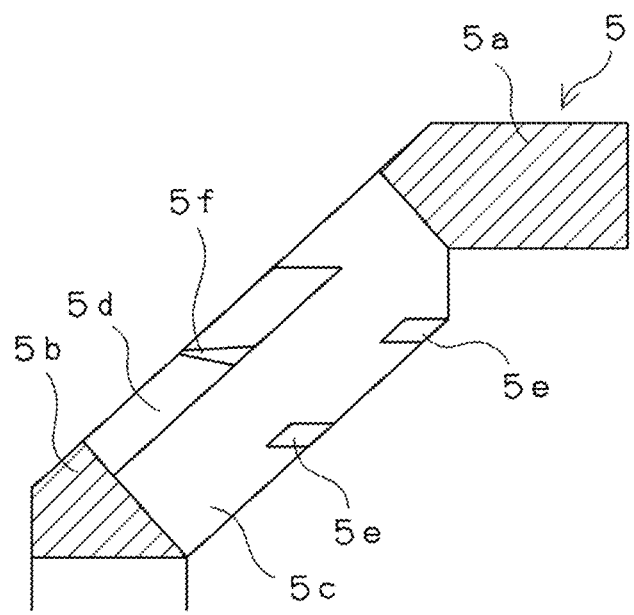
Figure 5:
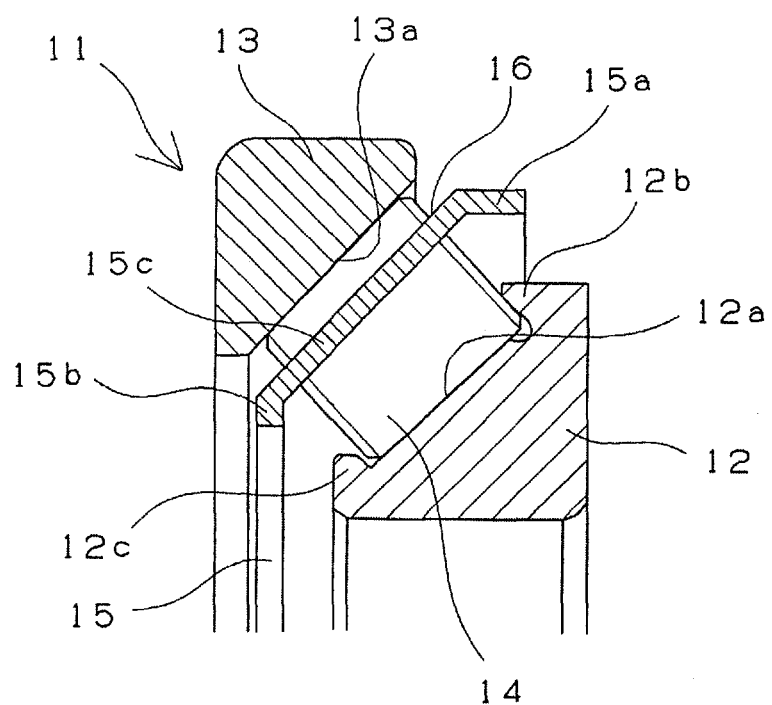
FIG. 5 is an axial cross-sectional view of a conventional tapered roller bearing.
Figure 6:
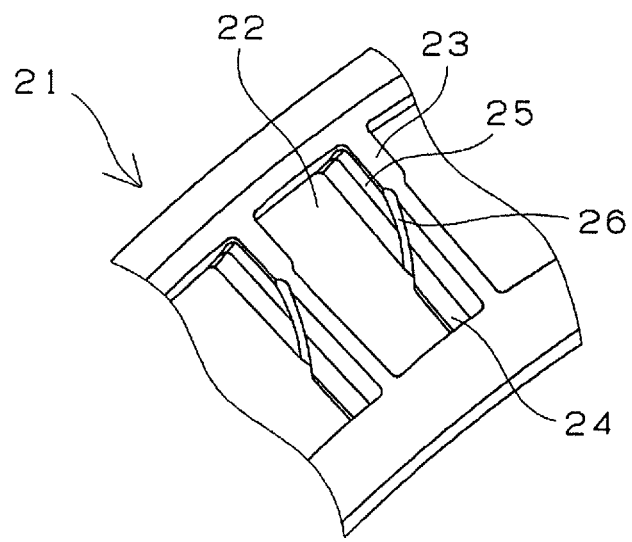
FIG. 6 is a perspective view of a part of a retainer of the conventional tapered roller bearing.

Next, a measure of improving lubricating performance on the guide surface for the tapered roller in the retainer is described with reference to FIGS. 4(a) and 4(b). As described above, in the retainer of the tapered roller bearing according to the present invention, the guide portion is formed to be wide, and therefore the tapered roller can be retained stably. In FIG. 4(a) and FIG. 4(b), in such a guide portion 5d, a lubricant is promoted to flow into the guide surface by arranging a groove 5f penetrating both end portions in an axial direction of the guide portion 5d. The guide portion 5d is formed in a discontinuous shape due to the groove 5f. In a configuration shown in FIG. 4(a), one groove 5f parallel to the axial direction is arranged at substantially the center of the guide portion 5d. Further, in a configuration shown in FIG. 4(b), the groove 5f of the guide portion 5d is formed in a wedge shape, and an apex of a convex part of the wedge shape is arranged at the outer diameter side. That is, a width of the groove 5f is increased from an end portion in the axial direction at the outer diameter side of the retainer toward an opposite end portion in the axial direction. With such a construction, a lubricant reservoir can be formed easily, and the lubricant is hardly scattered to an outside under an environment in which centrifugal force is applied. The groove 5f can be formed easily at the same time in the injection molding of the guide portion 5d.

The retainer described above of the tapered roller bearing according to the present invention is formed of a resin molded body using a resin composition. Any resin composition can be used as long as the resin composition can be applied to the injection molding and the resin composition has sufficient heat resistance and mechanical strength as the material of the retainer. Examples of the resin composition include: a polyamide (PA) resin such as a polyamide 6 (PA6) resin, a polyamide 4-6 (PA46) resin, a polyamide 6-6 (PA66) resin, a polyamide 6-10 (PA610) resin, a polyamide 9-T (PA9T) resin, and a polymetaxylylene adipamide (polyamide MXD-6) resin; a fluororesin, which can be applied to the injection molding, such as a tetrafluoroethylene-perfluoroalkyl vinyl ether (PFA) copolymer resin; a polyethylene (PE) resin; a polycarbonate (PC) resin; a polyacetal (POM) resin; a polyphenylene sulfide (PPS) resin; a polyether ether ketone (PEEK) resin; a polyamide-imide (PAI) resin; and a polyether-imide (PEI) resin. Each of the synthetic resin may be used independently, or alternatively may be used as a polymer alloy compounding more than two of them.

In order to improve the mechanical strength of the retainer such as the elastic module, it is preferable that fiber reinforcing material such as glass fiber, aramid fiber, carbon fiber, and mineral fiber (whisker) is compounded into the resin not to deteriorate the injection molding performance. Further, as a known filling material or an additive agent, an inorganic filling material such as calcium silicate, clay, talc, and mica; a solid lubricant such as graphite, molybdenum disulfide, tungsten disulfide, and polytetrafluoroethlylene resin powder; an antistatic agent; a conductive material; a pigment; or a release agent may be compounded as needed.

One example of the embodiment of the tapered roller bearing according to the present invention in which the retainer fulfills the features (A) and (1) is described with reference to drawings, however the tapered roller bearing according to the present invention in which the retainer fulfills the features (A) and (1) is not limited to this.

One example of the tapered roller bearing according to the present invention in which the retainer fulfills the features (A) and (2) is described with reference to FIG. 7 and FIGS. 8(a) and 8(b). In the description below, the tapered roller bearing according to the present invention denotes the tapered roller bearing according to the present invention in which the retainer fulfills the features (A) and (2).

Figure 7:
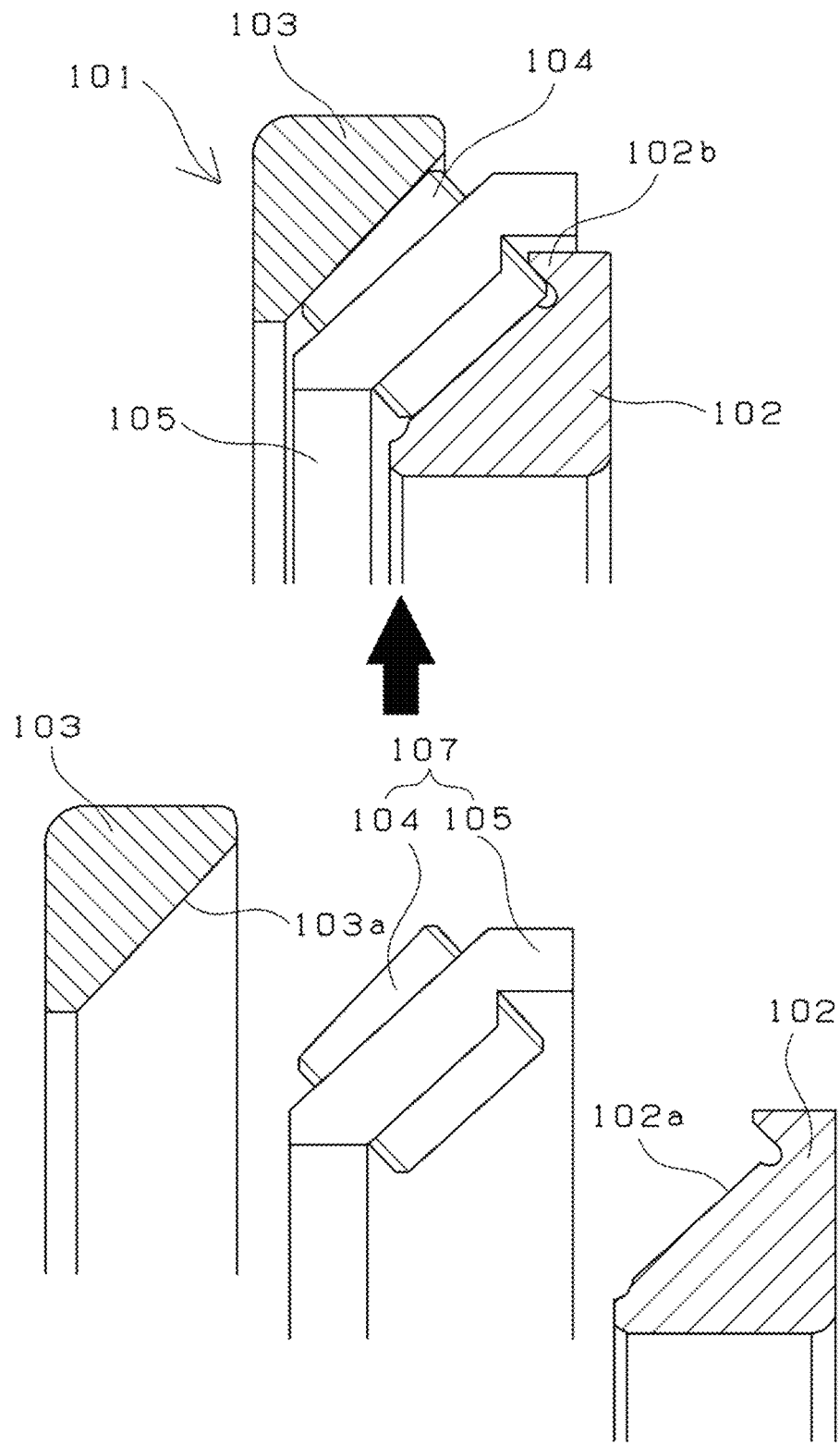
FIG. 7 is a view illustrating one example of the tapered roller bearing according to the present invention.

FIG. 7 is an axial cross-sectional view of the tapered roller bearing without an inner ring small flange and an exploded view thereof. FIG. 8(a) is an axial cross-sectional view of the retainer, and FIG. 8(b) is a cross-sectional view along an axis of a tapered roller of the retainer. As shown in FIG. 7, a tapered roller bearing 101 includes an inner ring 102 having a tapered raceway surface 102a on an outer circumferential surface, an outer ring 103 having a tapered raceway surface 103a on an inner circumferential surface, a plurality of tapered rollers 104 which rolls between the raceway surface 102a of the inner ring 102 and the raceway surface 103a of the outer ring 103, and a retainer 105 which retains the tapered rollers 104 in a rolling manner in a pocket portion at the same intervals in a circumferential direction. Each of the raceway surfaces is formed in a tapered shape in which a diameter formed by each of the raceway surfaces is increased or decreased along an axial direction. An angle of the taper is not especially limited, however the angle is normally set in a range between 15° and 60° against the axial direction. In the tapered roller bearing 101, a small flange is not arranged on a small diameter side end portion of the inner ring 102, and a large flange 102b is integrally formed on a large diameter side end portion of the inner ring 102. Here, the tapered roller bearing according to the present invention has a construction in which at least the small flange is omitted, and therefore a construction in which both of the small flange and the large flange are omitted may be adopted as needed.

As shown in the exploded view in FIG. 7, the tapered roller bearing 101 is used after being assembled in a target portion together with an integrated member 107 in which the retainer 105 and the tapered roller 104 are integrated, and the inner ring 102 and the outer ring 103. When the retainer and the tapered roller are integrated to form the integrated member, a drop-off prevention mechanism is necessary to prevent the tapered roller 104 from dropping off from the retainer 105 (to keep the integrated state) in assembling as described above. In the tapered roller bearing according to the present invention, a claw portion for drop-off prevention of the tapered roller is arranged in a pocket portion of the retainer, and the tapered roller is assembled in the pocket portion through elastic deformation of the claw portion and thereby integrated with the retainer.

Figure 8:
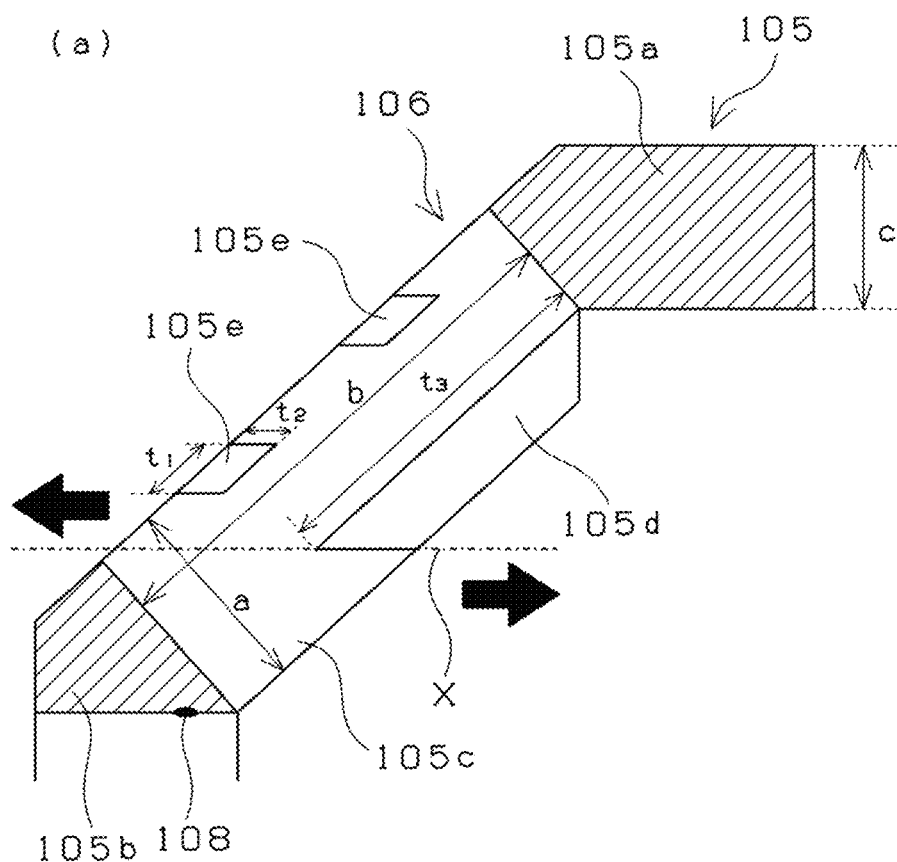
FIGS. 8(a) and 8(b) are axial cross-sectional views of the retainer in FIG. 7.
Figure 8:
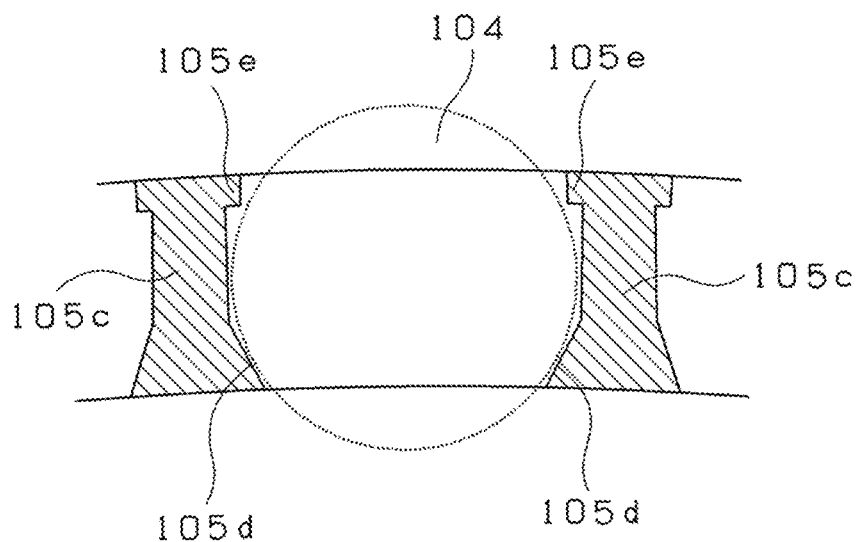

As shown in FIG. 8(a) and FIG. 8(b), the retainer 105 is formed by joining a large diameter ring portion 105a and a small diameter ring portion 105b, which are formed as rib portions, by a plurality of column portions 105c. The retainer 105 houses the tapered roller 104 in a pocket portion 106 between the column portions 105c. The retainer 105 is formed of an injection molded body formed by injection molding a resin composition described below. Here, a molding die dividing line X along an axial direction of the retainer (which is also an axial direction of the bearing) due to the injection molding is formed on the column portion 105c. The molding die dividing line X is shifted toward a small diameter side from the center of the column portion 105c. The injection molding die is formed of two molding dies of axial draw, and one is a molding die at the large diameter side (upper side in figure) with respect to the molding die dividing line X and another one is a molding die at a small diameter side (lower side in figure) with respect to the molding die dividing line X. One of the molding dies is a fixed molding die and another one is a movable molding die. As shown by black arrows in the figure, the molding die at the large diameter side (the upper side in the figure) with respect to the molding die dividing line X is relatively moved toward a left direction in the figure, and the molding die at the small diameter side (the lower side in the figure) with respect to the molding die dividing line X is relatively moved toward a right direction in the figure. The molding die dividing line X can be set in any position between the large diameter ring portion 105a and the small diameter ring portion 105b so as not to cross the ring portions.

The retainer 105 includes a guide portion 105d for the tapered roller at the large diameter side with respect to the molding die dividing line X of the column portion 105c and at an inner diameter side of the retainer, and a claw portion 105e for the drop-off prevention of the tapered roller at the large diameter side with respect to the molding die dividing line X of the column portion 105c and at an outer diameter side of the retainer. As shown in FIG. 8(b), the guide portion 105d is formed of a surface (guide surface) which narrows a width in a circumferential direction of an opening of the pocket portion. The tapered roller 104 rolls while contacting with a part of the guide surface of the guide portion 105d when driven. The guide surface may be formed in a curved surface along the tapered roller or a flat surface (straight surface). Further, the guide portion 105d forms a tapered opening along a generating line of the tapered roller when seen from a surface side of the opening of the pocket portion.

The guide portion 105d can prevent the tapered roller 104 from dropping off from the retainer 105 at a side where the guide portion 105d is formed. The tapered roller 104 is inserted (fitted) into the pocket portion 106 of the retainer 105 from the inner diameter side of the retainer while deforming the claw portion 105e by a hooking margin, and thereby the tapered roller 104 is surrounded the guide portion 105d and the claw portion 105e in the pocket portion 106 and retained.

It is preferable that a width $t_3$ of the guide portion 105d in a taper direction is set to be equal to or more than 51% of a width b of the column portion 105c in the taper direction (a width of the pocket portion). With this, the tapered roller can be retained further stably. The width $t_3$ is set to be preferably equal to or more than 55%, more preferably equal to or more than 60%, and most preferably equal to or more than 65%. In a configuration shown in FIG. 8(a), the guide portion 105d is continuously formed from the small diameter ring portion 105b to right before the molding die dividing line X. With such a configuration, the width $t_3$ can be ensured as long as possible while arranging the guide portion 105d at the large diameter side with respect to the molding die dividing line X.

The claw portion 105e may be arranged in any position at the large diameter side with respect to the molding die dividing line X and the outer diameter side of the retainer. It is preferable that the claw portion 105e is arranged at a position which facilitates the retaining of the tapered roller in relation with the position of the guide portion. In the configuration shown in FIG. 8(a), two claw portions 105e having the same shape are separately arranged in a range of the width in the taper direction of the guide portion 105d. The number of the claw portions is not limited to this, and the number of the claw portions is at least one, and therefore more than three claw portions may be arranged in order to retain the tapered roller stably.

As described above, both of the guide portion 105d and the claw portion 105e are arranged at the large diameter side with respect to the molding die dividing line X, and thereby the guide portion 105d and the claw portion 105e are formed by the same side molding die. The claw portion 105e is formed by the molding die which forms the guide portion 105d, and at this time, the claw portion 105e is formed through forced extraction. In this case, stress is generated on the claw portion, and therefore a break of a distal end (crack) or whitening of a proximal end might be generated. In a case in which a height of the claw portion is defined as h, a width of the claw portion in the taper direction of the column portion is defined as $t_1$, and a width of the claw portion in the axial direction of the retainer is defined as $t_2$ (see FIG. 8(a)), an analysis result of a relationship between these values and the crack and the whitening when the forced extraction in the injection molding is shown in Table 3. Here, the material of the retainer is PA66 resin (30 vol. % of glass fiber is compounded), and in the table, "○" denotes a case in which the crack and the whitening are not generated, "Δ" denotes a case in which the crack is not generated while the whitening is generated, and "x" denotes a case in which the crack is generated.

TABLE 3

|  |  | $h/t_1$ | | | | |
| --- | --- | --- | --- | --- | --- | --- |
|  |  | 0.01 | 0.02 | 0.03 | 0.04 | 0.1 |
| $h/t_2$ | 0.01 | x (crack) | x (crack) | x (crack) | Δ (whitening) | Δ (whitening) |
|  | 0.02 | Δ (whitening) | ○ | ○ | ○ | ○ |
|  | 0.03 | Δ (whitening) | ○ | ○ | ○ | ○ |
|  | 0.04 | Δ (whitening) | ○ | ○ | ○ | ○ |
|  | 0.05 | Δ (whitening) | ○ | ○ | ○ | ○ |

As shown in Table 3, in a case in which the height h of the claw portion is set against the width $t_1$ of the claw portion in the taper direction of the column portion such that $h/t_1$ is equal to or more than 0.02, and the height h of the claw portion is set against the width $t_2$ of the claw portion in the axial direction of the retainer such that $h/t_2$ is equal to or more than 0.02, it is found that generation of the crack and the whitening when the forced extraction in the injection molding can be prevented.

Further, it is preferable that the distal end of the claw portion 105e in a thickness direction is formed in an R-shape. With this, the crack and the whitening can be further prevented. Further, a burr is hardly generated. An analysis result of a relationship between the radius R, the height h of the claw portion, and the crack and the whitening when the forced extraction in the injection molding, and the retaining performance of the tapered roller is shown in Table 4. Here, in the table, "○" denotes a case in which there is no problem in the retaining performance and in the injection molding, "Δ" denotes a case in which the injection molding is enabled while the whitening is generated, and "-" denotes a case in which the analysis is not done.

TABLE 4

| R/h | 0.2 | 0.5 | 1 | 1.5 | 2 |
| --- | --- | --- | --- | --- | --- |
| state of claw portion | x (crack) | ○ | ○ | ○ | ○ |
| retaining performance of roller | — | ○ | ○ | ○ | Δ (whitening) |

As shown in Table 4, in a case in which the radius R of the R-shape of the distal end is set in a range between 0.5 h and 1.5 h against the height h of the claw portion, the crack and the whitening in the force extraction of the injection molding can be prevented and excellent retaining performance of the tapered roller can be obtained.

Next, a measure of improving mechanical strength of the retainer is described. As shown in FIG. 8(a), as a thickness of the large diameter ring portion 105a is defined as c and a wall thickness of the column portion is defined as a, it is preferable that c against a is set in a range between 81% and 120%. With such a dimensional relation, the ring rigidity of the retainer can be improved. More preferably, c against a is set in a range between 84% and 100%.

Further, as shown in FIG. 8(a), it is preferable that a gate 108, which is an insertion port of resin in the injection molding, is arranged at the inner diameter side of the small diameter ring portion 105b. With this, a welding position can be set between the column portions of the large diameter ring portion 105a, and therefore deterioration of the strength of the retainer can be suppressed. Further, in a case in which the gate is arranged on the small diameter ring portion 105b, it is preferable that a wall thickness of the small diameter ring portion 105b is set to be 1.6 times through 4 times as large as a diameter of the gate. With this, the molding can be performed while avoiding a short shot.

Figure 9:
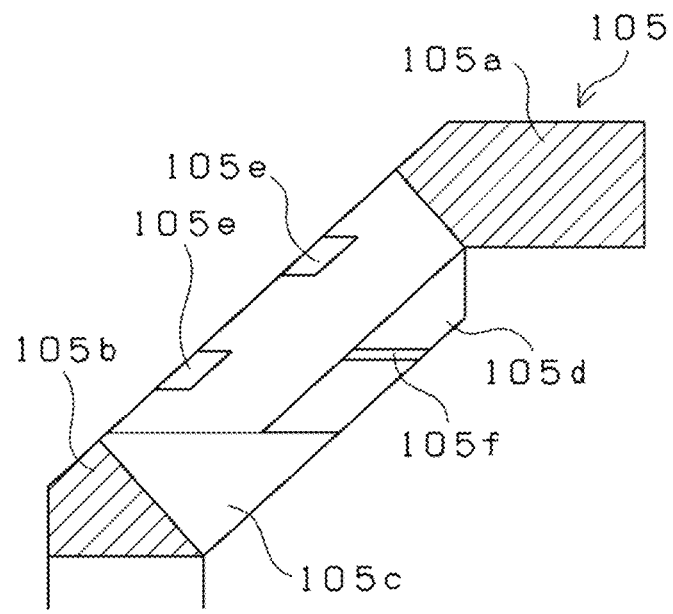
FIGS. 9(a) and 9(b) are axial cross-sectional views of the retainer illustrating a configuration of the groove of the guide portion.
Figure 9:
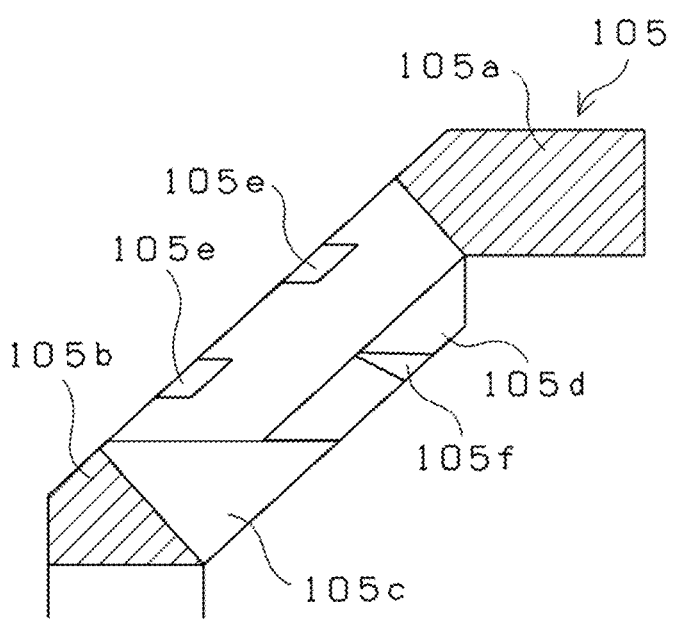

Next, a measure of improving lubricating performance on the guide surface for the tapered roller in the retainer is described with reference to FIGS. 9(a) and 9(b). As described above, in the retainer of the tapered roller bearing according to the present invention, the guide portion is formed to be wide, and therefore the tapered roller can be retained stably. In FIG. 9(a) and FIG. 9(b), in such a guide portion 105d, a lubricant is promoted to flow into the guide surface by arranging a groove 105f penetrating both end portions in an axial direction of the guide portion 105d. The guide portion 105d is formed in a discontinuous shape due to the groove 105f. In a configuration shown in FIG. 9(a), one groove 105f parallel to the axial direction is arranged at substantially the center of the guide portion 105d. Further, in a configuration shown in FIG. 9(b), the groove 105f of the guide portion 105d is formed in a wedge shape, and an expanded side of a convex part of the wedge shape is arranged at the inner diameter side. That is, a width of the groove 105f is decreased from an end portion in the axial direction at the inner diameter side of the retainer toward an opposite end portion in the axial direction. With such a configuration, a lubricant reservoir can be formed easily, and the lubricant is hardly scattered to an outside under an environment in which centrifugal force is applied. The groove 105f can be formed easily at the same time in the injection molding of the guide portion 105d.

The retainer described above of the tapered roller bearing according to the present invention is formed of a resin molded body using a resin composition. The resin composition is the same as that in the tapered roller bearing according to the present invention in which the retainer fulfills the features (A) and (1) described above.

One example of the embodiment of the tapered roller bearing according to the present invention in which the retainer fulfills the features (A) and (2) is described with reference to drawings, however the tapered roller bearing according to the present invention in which the retainer fulfills the features (A) and (2) is not limited to this.

The tapered roller bearing according to the present invention in which the retainer fulfills the feature (B) is described.

In a use in which rigidity is required against a moment load, such as a rolling bearing used in an industrial robot, an angular ball bearing or a tapered roller bearing is generally pressurized to use. In a case in which high rigidity is required, the tapered rolling bearing having a large load capacity in the same size is rather used. In recent years, the moment load against a size of the bearing becomes larger, and therefore necessary rigidity has been increased. Further, a space for the bearing becomes smaller due to miniaturization of a whole of an apparatus. That is, a tapered roller bearing having a small size and a high load capacity is desired.

Relating to such a tapered roller bearing, in JP 2007-32679 A, a configuration in which an inner ring small flange is omitted in order to increase a load capacity and a raceway surface is ensured by continuing an inner ring raceway surface until a small diameter side end portion of an inner ring is disclosed. The tapered roller, the inner ring, and the retainer are separated by continuing the raceway surface on the inner ring until the small diameter side end portion, however in JP 2007-32679 A and JP 2014-202284 A, the tapered roller and the retainer can be integrated by modifying a shape of the retainer. For example, in JP 2014-202284 A, in order to prevent the tapered roller from dropping off from a pocket portion in assembling, tapered surfaces are formed at an inner diameter side and an outer diameter side of a column portion, respectively. The tapered surface at the inner diameter side and the tapered surface at the outer diameter side are diagonally arranged to each other on one surface of the column portion. Further, in JP 2014-202284 A, as a manufacturing method of the retainer in which the tapered roller and the retainer are integrated, it is disclosed that the retainer is formed by means of injection molding using two molding dies in an axial direction (axial draw).

Figure 12:
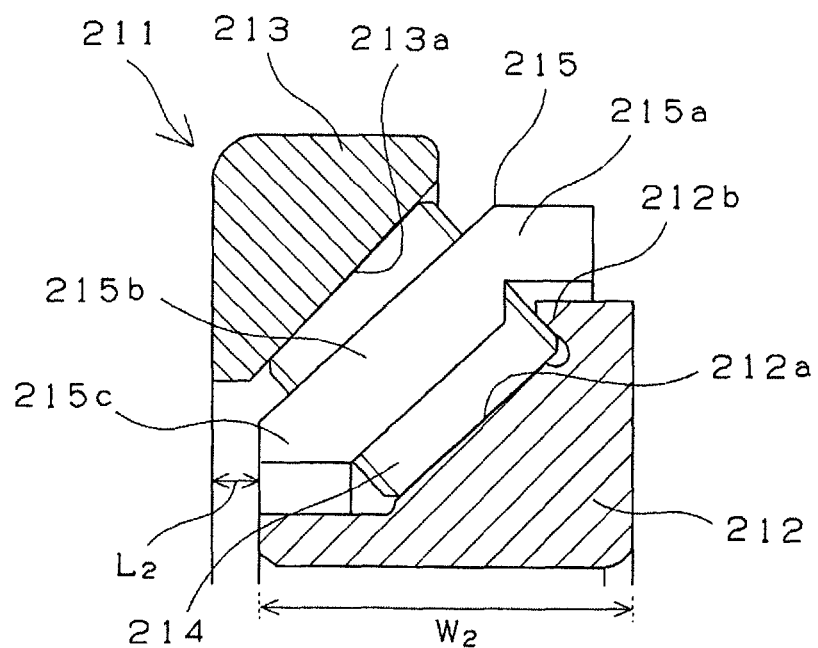
FIG. 12 is an axial cross-sectional view of a conventional tapered roller bearing.

A general tapered rolling bearing according to a conventional technique is described with reference to FIG. 12. As shown in FIG. 12, a tapered roller bearing 211 is provided with an inner ring 212 having a tapered raceway surface 212a on an outer circumference surface, an outer ring 213 having tapered raceway surface 213a on an inner circumferential surface, a plurality of tapered rollers 214 which rolls between the raceway surface 212a of the inner ring 212 and the raceway surface 213a of the outer ring 213, and a retainer 215 which retains each tapered rollers 214 in each pocket portion in a rolling manner. The retainer 215 is formed by joining a large diameter ring portion 215a and a small diameter ring portion 215c by a plurality of column portions 215c. The retainer 215 houses the tapered roller 214 in a pocket portion 216 between the column portions 215c adjacent to each other. Further, a small flange on a small diameter side end portion of the inner ring 212 is omitted, and a large flange 212b is integrally formed on a large diameter side end portion of the inner ring 212. The inner ring in the tapered roller bearing has the tapered raceway surface, and thereby the inner ring includes a small side and a large side when seen from an axial direction. "The small flange" is a flange arranged on the small diameter side end portion, and "the large flange" is a flange arranged on the large diameter side end portion.

In this way, the retainer of the conventional tapered roller bearing has a construction including the small diameter ring portion, the large diameter ring portion, and the column portion. In the markets, design of the bearing in which a length between an outer ring end surface and a retainer end surface (retainer drawing amount $L_2$ in FIG. 12) is made large as much as possible is demanded, however expansion of the length is restricted due to a problem of interference with the small diameter ring portion of the retainer. Further, it is necessary to make the width of the large flange to be small in order to fulfill the demand described above, and therefore the strength might be decreased.

Further, in a case in which parts (the tapered surface at the inner diameter side and the tapered surface at the outer diameter side) to be a hooking margin when the tapered roller and the retainer are integrated are diagonally arranged as disclosed in JP 2014-202284 A, a molding die dividing surface might be complicated. Further, retaining performance of the tapered roller might not be sufficient because the tapered roller is deviated when the tapered roller is retained.

The tapered roller bearing according to the present invention in which the retainer fulfills the feature (B) is derived to solve such a problem, and thereby the drawing amount of the retainer can be expanded without narrowing the width of the large flange, and the tapered roller and the retainer can be integrated as needed.

The tapered roller bearing according to the present invention in which the retainer fulfills the feature (B) includes column portions, a ring portion arranged at one of a small diameter side and a large diameter side of the retainer to support the column portions at the same intervals in a circumferential direction, the pocket portion being arranged between the column portions adjacent to each other, and a protrusion arranged at an end portion opposite to a side of the ring portion of the column portion and protruded toward a side of the pocket portion to support one end surface of the tapered roller, and therefore the drop-off of the tapered roller from the retainer can be prevented with a construction in which one of the ring portions is omitted. Further, a length in the axial direction of the retainer or a length in the axial direction of a whole of the tapered roller bearing can be shortened.

Especially, in the retainer described above, the ring portion is arranged on the retainer at the large diameter side and the ring portion at the small diameter side is omitted, and thereby a drawing amount of the retainer from an outer ring end surface can be expanded largely. Further, it is not necessary to forcibly narrow a width of the large flange of the inner ring, and thereby deterioration of the strength can be prevented. Further, a width of the inner ring can be made small.

The column portion includes the guide portion of the tapered roller formed of the surface which narrows the width in the circumferential direction of the opening of the pocket portion and the claw portion for the drop-off prevention of the tapered roller, and thereby the tapered roller and the retainer can be integrated by using the guide portion, the claw portion, and the protrusion described above with a construction without the small diameter ring portion. With this, a construction without a small flange can be obtained and an increase of load capacity and miniaturization can be achieved by extending a length of the tapered roller.

The retainer is formed of the injection molded body of a resin composition, and thereby the guide portion, the claw portion, and the protrusion having a specific shape described above can be formed integrally with a retainer body easily. Further, the guide portion and the claw portion arranged at the same side (the small diameter side or the large diameter side) with respect to the molding die dividing line of the column portion in the injection molding, and thereby the guide portion and the claw portion can be molded by the same side molding die in molding using the two molding die of the axial draw, and a construction of the molding die can be simplified.

One example of the tapered roller bearing according to the present invention in which the retainer fulfills the feature (B) is described with reference to FIG. 10 and FIGS. 11(a) and 11(b). In the description below, the tapered roller bearing according to the present invention denotes the tapered roller bearing according to the present invention in which the retainer fulfills the feature (B).

Figure 10:
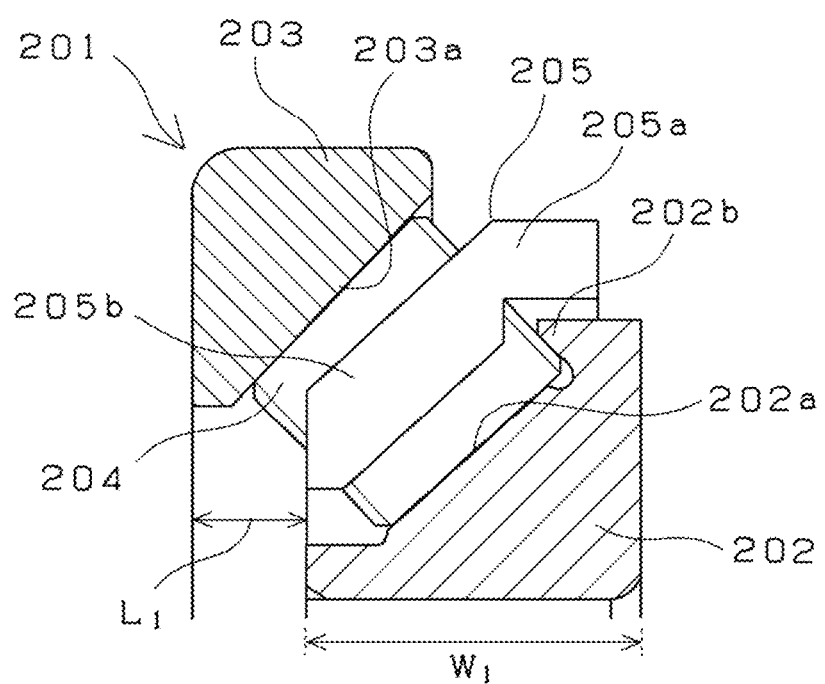
FIG. 10 is an axial cross-sectional view illustrating one example of the tapered roller bearing according to the present invention.

FIG. 10 is an axial cross-sectional view of the tapered roller bearing provided with the retainer without a small diameter side ring portion. FIGS. 11(a) and 11(b) are an axial cross-sectional view of the retainer (FIG. 11(a)) and a view seen from A direction (FIG. 11(b)). As shown in FIG. 10, a tapered roller bearing 201 includes an inner ring 202 having a tapered raceway surface 202a on an outer circumferential surface, an outer ring 203 having a tapered raceway surface 203a on an inner circumferential surface, a plurality of tapered rollers 204 which rolls between the raceway surface 202a of the inner ring 202 and the raceway surface 203a of the outer ring 203, and a retainer 205 which retains the tapered rollers 204 in a rolling manner in a pocket portion at the same intervals in a circumferential direction.

Each of the raceway surfaces is formed in a tapered shape in which a diameter formed by each of the raceway surfaces is increased or decreased along an axial direction. An angle of the taper is not especially limited, however the angle is normally set in a range between 15° and 60° against the axial direction. When the angle is large, the moment rigidity is made large.

Figure 11:
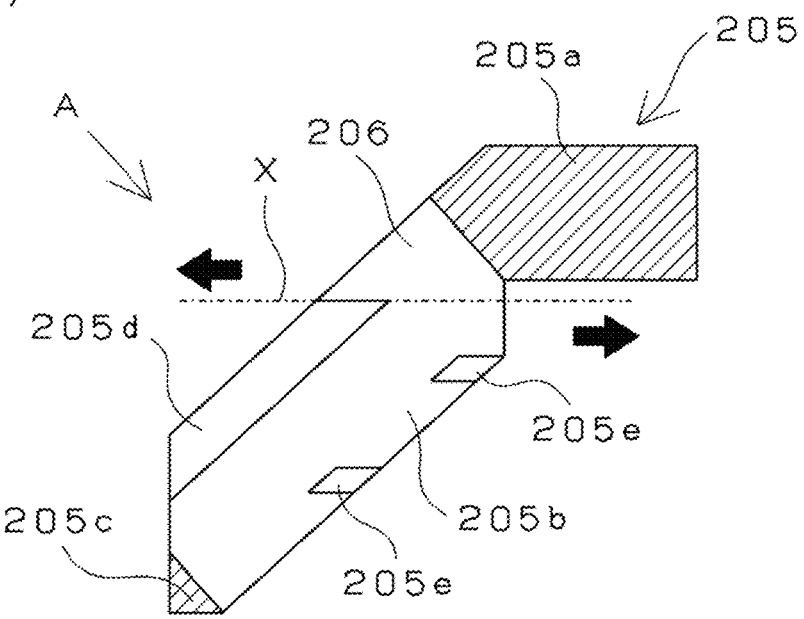
FIGS. 11(a) and 11(b) are an axial cross-sectional view of the retainer in FIG. 10 and a view seen from A direction.
Figure 11:
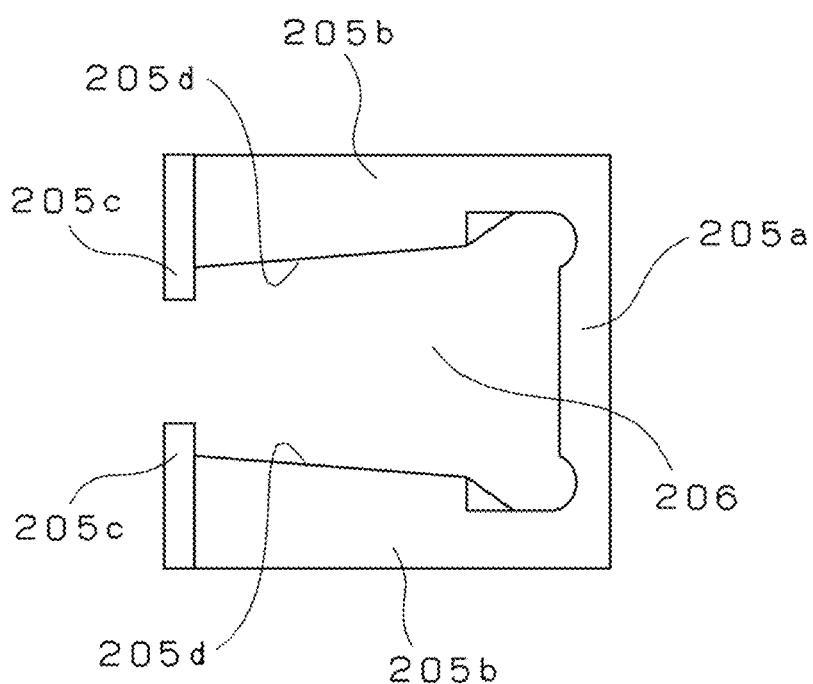

As shown in FIGS. 11(a) and 11(b), the retainer 205 is formed by a large diameter ring portion 205a, which is formed as a rib portion, and a plurality of column portions 205b joined to the large diameter portion 205a. That is, a small diameter ring is not arranged. A plurality of the column portions 205b are supported by the ring portion 205a at the same intervals in the circumferential direction. A pocket portion 206 is formed between the column portions 205b adjacent to each other, and a protrusion 205c, which is protruded toward the pocket portion and formed to support one end surface (small diameter end surface) of the tapered roller, is arranged at an end portion (small diameter side end portion) opposite to aside of the ring portion of the column portion 205b. The protrusion 205c is arranged such that a support surface for the tapered roller and a pocket plane of a conventional product are arranged on the same plane. Further, a position and a shape of the protrusion 205c are not especially limited as long as the protrusion 205 can prevent the tapered roller from dropping off. As shown in FIG. 10, in the tapered roller bearing 201 according to the present invention, the tapered roller 204 is housed in the pocket portion 206.

In the retainer of the conventional normal tapered roller bearing, the pocket portion is formed by joining the large diameter ring portion and the small diameter ring portion by the column portion, while in the retainer of the tapered roller bearing according to the present invention shown in FIGS. 11(a) and 11(b), a construction in which a small diameter ring portion is omitted (comb type retainer) is adopted. The retainer of the tapered roller bearing according to the present invention can prevent the tapered roller from dropping off from a small diameter side by forming the protrusion 205c described above without forming the small diameter ring portion.

With the construction without the small diameter ring portion, the drawing amount of the retainer (drawing length) $L_1$ from the outer ring end surface can be expanded largely compared to that ($L_2$ in FIG. 12) of a conventional construction with the small diameter ring portion. Thus, it is not necessary to forcibly narrow the width of the large flange 202b for expanding the drawing amount of the retainer, and therefore deterioration of the strength can be prevented. Further, the width $W_1$ of the inner ring 202 can be made small compared to that of the conventional construction ($W_2$ in FIG. 12).

Further, in the retainer shown in FIG. 10 and FIGS. 11(a) and 11(b), the configuration in which the small diameter ring portion is omitted is adopted, however it is not limited to this, and a configuration in which the large diameter ring portion is omitted and the small diameter ring portion and the column portion are arranged may be adopted. As described above, the drawing amount of the retainer from the outer ring end surface can be expanded and thereby it is preferable to adopt the configuration in which the small diameter ring portion is omitted.

The tapered roller bearing 201 is used by being assembled in a target portion after combining an integrated member in which the retainer 205 and the tapered roller 204 are integrated, and the inner ring 202 and the outer ring 203. When the retainer and the tapered roller are integrated to form the integrated member, a roller drop-off prevention mechanism is necessary to prevent the tapered roller 204 from dropping off from the retainer 205 (to keep the integrated state) in assembling. In the tapered roller bearing according to the present invention, the protrusion 205c described above and a claw portion 205e for drop-off prevention are arranged in a pocket portion of the retainer (see FIG. 11(a)), and the tapered roller is assembled in the pocket portion through elastic deformation of the claw portion and then integrated with the retainer. With this integration, the inner ring small flange can be omitted. In the tapered roller bearing 201 shown in FIG. 10, the small flange is not arranged on the small diameter side end portion of the inner ring 202, and the large flange 202b is integrally formed on the large diameter side end portion of the inner ring 202. Alternatively, a construction in which both of the small flange and the large flange are omitted may be adopted.

The retainer is formed of an injection molded body by injection molding a resin composition. The resin composition is the same as that in the tapered roller bearing according to the present invention in which the retainer fulfills the features (A) and (1) described above.

Since the retainer is formed of an injection molded body formed by injection molding a resin composition, as shown in FIG. 11(a), a molding die dividing line X along an axial direction of the retainer (which is also an axial direction of the bearing) due to the injection molding is formed on the column portion 205c. The molding die dividing line X is shifted toward a large diameter side from the center of the column portion 205c. The injection molding die is formed of two molding dies of axial draw, and one is a molding die at the large diameter side (upper side in figure) with respect to the molding die dividing line X and another one is a molding die at a small diameter side (lower side in figure) with respect to the molding die dividing line X. One of the molding dies is a fixed molding die and another one is a movable molding die. As shown by black arrows in the figure, the molding die at the large diameter side (the upper side in the figure) with respect to the molding die dividing line X is relatively moved toward a left direction in the figure, and the molding die at the small diameter side (the lower side in the figure) with respect to the molding die dividing line X is relatively moved toward a right direction in the figure.

The retainer 205 shown in FIGS. 11(a) and 11(b) includes a guide portion 205d for the tapered roller at the small diameter side with respect to the molding die dividing line X of the column portion 205b and at an outer diameter side of the retainer, and a claw portion 205e at the small diameter side with respect to the molding die dividing line X of the column portion 205b and at an inner diameter side of the retainer. The guide portion 205d is formed of a surface (guide surface) which narrows a width in a circumferential direction of an opening of the pocket portion. The tapered roller 204 rolls while contacting with a part of the guide surface of the guide portion 205d when driven. The guide surface may be formed in a curved surface along the tapered roller or a flat surface (straight surface). Further, as shown in FIG. 11(b), the guide portion 205d forms a tapered opening along a generating line of the tapered roller when seen from a surface side of the opening of the pocket portion.

The guide portion 205d can prevent the tapered roller from dropping off from the retainer 205 at a side where the guide portion 205d is formed. The tapered roller is inserted (fitted) into the pocket portion 206 of the retainer 205 from the inner diameter side of the retainer 205 while deforming the claw portion 205e by a hooking margin, and thereby the tapered roller is surrounded by the ring portion 205a, the column portion 205b, the guide portion 205d, the claw portion 205e and the protrusion 205c in the pocket portion 206 and retained.

It is preferable that a width of the guide portion 205d in a taper direction is set to be equal to or more than 51% of a width of the column portion 205b in the taper direction (a width of the pocket portion). With this, the tapered roller can be retained further stably. In a configuration shown in FIG. 11(a), the guide portion 205d is continuously formed from the small diameter ring portion to right before the molding die dividing line X. The claw portion 205e may be arranged in any position at the small diameter side with respect to the molding die dividing line X and the inner diameter side of the retainer. It is preferable that the claw portion 205e is arranged at a position which facilitates the retaining of the tapered roller in relation with the position of the guide portion 205d. In the configuration shown in FIG. 11(a), two claw portions 205e having the same shape are separately arranged to be close to the molding die dividing line X in a range of the width in the taper direction of the guide portion 205d.

As described above, both of the guide portion 205d and the claw portion 205e are arranged at the small diameter side with respect to the molding die dividing line X, and thereby the guide portion 205d and the claw portion 205e can be formed by the same side molding die. The claw portion 205e is also formed by the molding die which forms the guide portion 205d. Further, the claw portion 205e is formed through forced extraction.

Further, as another configuration of the retainer of the tapered roller bearing according to the present invention, a positional relationship between the guide portion, the claw portion and the molding die dividing line X may be opposite to that in the configuration shown in FIGS. 11(a) and 11(b). That is, the retainer may have a construction in which the guide portion 205d for the tapered roller is arranged at the large diameter side with respect to the molding die dividing line X of the column portion 205b and at the inner diameter side of the retainer, and the claw portion 205e for drop-off prevention of the tapered roller is arranged at the large diameter side with respect to the molding die dividing line X of the column portion 205b and the outer diameter side of the retainer. In this configuration, both of the guide portion 205d and the claw portion 205e are arranged at the large diameter side with respect to the molding die dividing line X, and thereby, similar to the configuration shown in FIGS. 11(a) and 11(b), the guide portion 205d and the claw portion 205e can be molded by the same side (large diameter side) molding die.

One example of the embodiment of the tapered roller bearing according to the present invention in which the retainer fulfills the feature (B) is described with reference to drawings, however the tapered roller bearing according to the present invention in which the retainer fulfills the feature (B) is not limited to this.

Further, a tapered roller bearing Z according to another configuration is described.

In a use in which rigidity is required against a moment load, such as a rolling bearing used in an industrial robot, an angular ball bearing or a tapered roller bearing is generally pressurized to use. In a case in which high rigidity is required, the tapered rolling bearing having a large load capacity in the same size is rather used. In recent years, the moment load against a size of the bearing becomes larger, and therefore necessary rigidity has been increased. Further, a space for the bearing becomes smaller due to miniaturization of a whole of an apparatus. That is, a tapered roller bearing having a small size and a high load capacity is desired. In order to achieve the high load capacity, it is necessary to adopt a construction in which a small flange of an inner ring, or both of a small flange and a large flange are omitted in the tapered roller bearing. Thus, it is necessary to integrate the roller and the retainer while retaining the roller in the retainer. In the general tapered roller bearing, a metal plate retainer or a resin retainer is used, and therefore a configuration in which an inner ring, a roller, and a retainer are integrated (only the roller and the retainer are not integrated) is mainly adopted due to its construction.

Relating to such a tapered roller bearing, in JP 2007-32679 A, a configuration in which an inner ring small flange is omitted in order to increase a load capacity and a raceway surface is ensured by continuing an inner ring raceway surface until a small diameter side end portion of an inner ring is disclosed. The tapered roller, the inner ring, and the retainer are separated by continuing the raceway surface on the inner ring until the small diameter side end portion, however in JP 2007-32679 A, the tapered roller and the retainer can be integrated by modifying a shape of the retainer.

Further, in JP 2014-202284 A, in order to prevent the tapered roller from dropping off from a pocket portion in assembling, tapered surfaces are formed at an inner diameter side and an outer diameter side of a column portion, respectively. Further, in JP 2014-202284A, as a manufacturing method of the retainer in which the tapered roller and the retainer are integrated, it is disclosed that the retainer is formed by means of injection molding using two molding dies in an axial direction (axial draw).

In the tapered roller bearings disclosed in JP 2007-32679 A and JP 2014-202284 A, a guide type of the retainer is presumed from the drawings or the like as a roller guide type. On the other hand, in a resin retainer used in the tapered roller bearing, a minimum value of a wall thickness is defined from a manufacturing limitation in the injection molding. In a case in which the guide type of the retainer is the roller guide type, it is necessary to form a clearance between an outer circumferential surface of the retainer and a raceway surface of the outer ring (hereinafter, merely referred to as "clearance") in order to avoid the outer circumferential surface of the retainer contacting with the raceway surface of the outer ring in driving. When a size of the bearing is made small, the wall thickness of the retainer should be made thin in order to ensure the clearance.

However, there is a size limitation in manufacturing of the wall thickness of the resin retainer as described above, and therefore the clearance cannot be ensured sufficiently when the wall thickness is less than a predetermined value, and consequently the retainer and the outer ring are contacted with each other partially due to whirling of the retainer in driving. With such a contact, a failure such as wear on the outer circumferential surface of the retainer and the raceway surface of the outer ring and a crack on the retainer caused by an excessive load due to the local contact might occur.

The tapered roller bearing Z is derived to solve the problem described above, and an object thereof is to provide a tapered roller bearing provided with a retainer formed of resin capable of suppressing wear of the raceway surface of the outer ring due to the local contact with the retainer or a crack on the retainer when the bearing size is small.

Relating to this, the tapered roller bearing Z includes the following features (1) through (6).

That is, (1) The tapered roller bearing Z includes an inner ring having a tapered raceway surface on an outer circumferential surface, an outer ring having a tapered raceway surface on an inner circumferential surface, a plurality of tapered rollers which rolls between the raceway surface of the inner ring and the raceway surface of the outer ring, and a retainer formed of resin which retains the tapered rollers in a pocket portion in a rolling manner. An angle between the raceway surface of the outer ring and a bearing center axis is set in a range between 30° and 50°. The retainer includes a large diameter ring portion, a small diameter ring portion, and column portions, each of which joins the large diameter ring portion and the small diameter ring portion. The pocket portion is arranged between the column portions adjacent to each other. The retainer is guided by the outer ring, the inner ring, or other member arranged at a large diameter side of the outer ring.

(2) As a first guide configuration of the retainer, the retainer includes a tapered outer circumferential surface formed of a surface of the column portion. The retainer is guided by the outer ring while the outer circumferential surface is contacting with the raceway surface of the outer ring. An inclined angle of the outer circumferential surface of the retainer is set to be equal to an inclined angle of the raceway surface of the outer ring.

(3) As a second guide configuration of the retainer, the retainer is guided by the other member while an outer circumferential surface of the large diameter ring portion is contacting with the other member.

(4) As a third guide configuration of the retainer, the retainer is guided by the inner ring while an inner circumferential surface of the large diameter ring portion is contacting with the inner ring.

(5) A wall thickness in a radial direction of the tapered roller bearing is equal to or less than 13.5 mm.

(6) The inner ring has a construction without a small flange at a small diameter side end portion or a construction without a small flange at a small diameter side end portion and without a large flange at a large diameter side end portion. The retainer includes a drop-off prevention portion for the tapered roller in the pocket portion, and the tapered roller is retained in the pocket portion by the drop-off prevention portion.

The tapered roller bearing Z includes a contact angle of a large gradient (an angle between the raceway surface of the outer ring and the bearing center axis is set in a range between 30° and 50°) and includes the retainer having the large diameter ring portion, the small diameter ring portion, and a plurality of the column portions joining the large diameter ring portion and the small diameter ring portion, and having the pocket portion between the column portions adjacent to each other. The retainer is not formed as a roller guide type but formed as a configuration in which the retainer is guided by the outer ring, inner ring, or the other member arranged at the outer diameter side of the ring outer ring, and thereby even if a bearing size is small (for example, a wall thickness in the radial direction is equal to or less than 13.5 mm), the wear of the raceway surface of the outer ring due to the local contact with the retainer or the crack on the retainer can be suppressed.

As the first guide configuration of the retainer, the retainer includes the tapered outer circumferential surface formed of the surface of the column portion. The retainer is guided by the outer ring while the outer circumferential surface is contacting with the raceway surface of the outer ring. The inclined angle of the outer circumferential surface of the retainer is set to be equal to the inclined angle of the raceway surface of the outer ring. With this configuration, even if the clearance between the outer circumferential surface of the retainer and the raceway surface of the outer ring is small, both surfaces can be prevented from contacting locally at the small diameter side of the retainer, and the wear of the contact surface can be prevented, and a load of the retainer can be decreased.

As the second guide configuration of the retainer, the retainer is guided by the other member while the outer circumferential surface of the large diameter ring portion is contacting with the other member, or alternatively, as the third guide configuration of the retainer, the retainer is guided by the inner ring while the inner circumferential surface of the large diameter ring portion is contacting with the inner ring. With these configurations, the retainer is not contacted with the raceway surface of the outer ring directly, and therefore the wear and the crack on the raceway surface can be prevented.

The inner ring has the construction without the small flange at the small diameter side end portion or the construction without the small flange at the small diameter side end portion and without the large flange at the large diameter side end portion. The retainer includes the drop-off prevention portion for the tapered roller in the pocket portion, and the tapered roller is retained in the pocket portion by the drop-off prevention portion. With such a configuration in which the small flange is omitted, an increase of the load capacity and miniaturization can be achieved by extending a length of the tapered roller, and the tapered roller can be prevented from dropping off from the retainer in assembling by a predetermined integrated construction.

Hereinafter, the tapered roller bearing Z is described in detail with reference to drawings.

Figure 16:
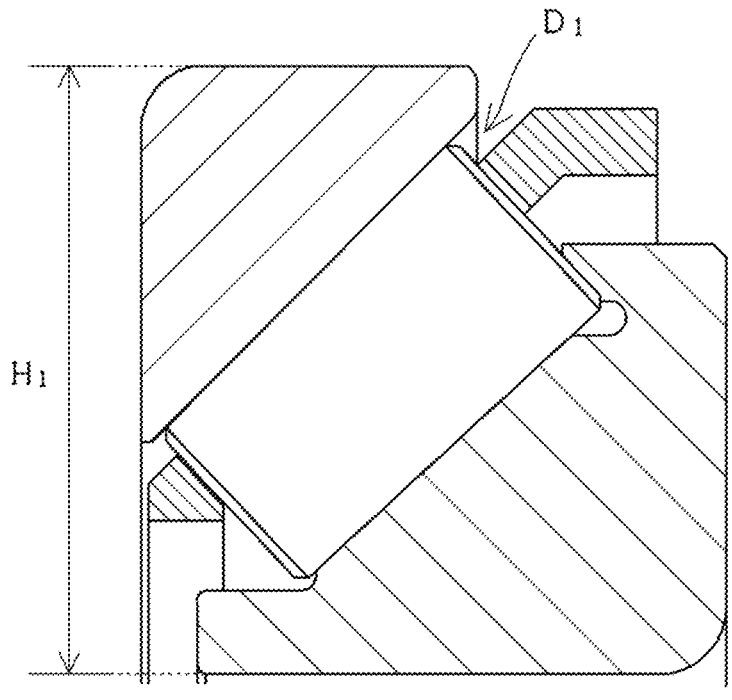
FIG. 16 is a view illustrating a clearance between an outer ring and a retainer and a wall thickness in a radial direction.
Figure 16:
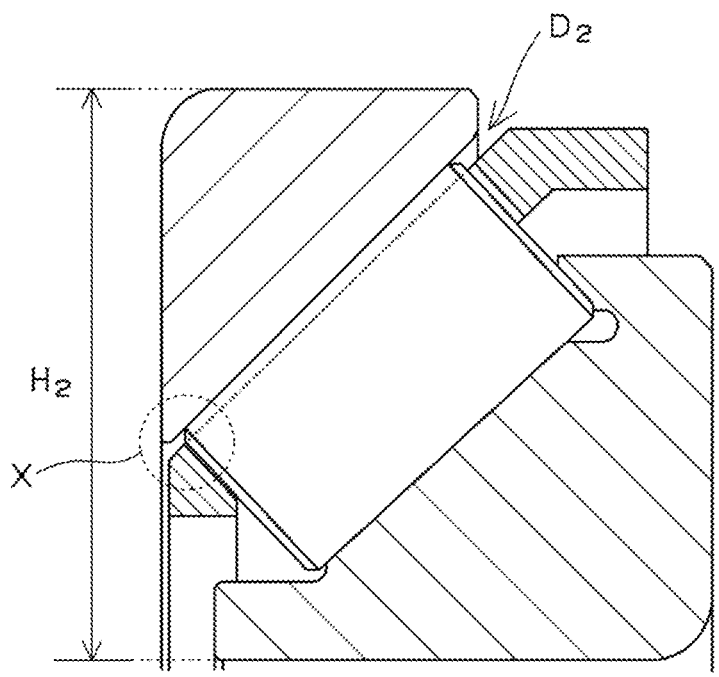

The tapered roller bearing Z (radial tapered roller bearing) is applied to a configuration in which (1) the contact angle of the large gradient (contact angle: 30° to 50°) and (2) the retainer is formed of resin. Here, the contact angle is defined as an angle between the raceway surface of the outer ring and the bearing center axis. There is a size limitation in manufacturing in injection molding of the wall thickness of the resin retainer. The conventional resin retainer is guided by a roller, however in a case in which the contact surface of the large gradient is set as described above and the wall thickness in the radial direction of the bearing is thin, the gap (clearance) between the outer circumferential surface of the retainer and the raceway surface of the outer ring cannot be ensured, and therefore the outer circumferential surface of the retainer and the raceway surface of the outer ring might be contacted with each other. This relation is described in detail with reference to FIG. 16. When the wall thickness in the radial direction of the bearing becomes thinner from $H_1$ to $H_2$, the clearance also becomes thin from $D_1$ to $D_2$ because the wall thickness of the retainer cannot be set to be less than a predetermined value. An angle of the outer circumferential surface of the retainer and an angle of the raceway surface of the outer ring in the conventional one are designed such that cone points are matched with each other, and therefore the outer circumferential surface and the raceway surface are not parallel to each other. Thus, when the clearance becomes small as described above, it is likely that the retainer contacts with the outer ring at a small diameter side X of the outer circumferential surface of the retainer. With this contact, the crack or the wear on the raceway surface of the outer ring might be generated or the wear on the outer circumferential surface of the resin retainer or an excessive load due to the local contact might be generated.

An analysis result of a relationship between the wall thickness in the radial direction and the clearance (existence of the contact between the outer ring and the retainer) in the resin retainer with the contact angle of 45° is shown in Table 5. As shown in Table 5, it is found that the raceway surface of the outer ring and the outer circumferential surface of the retainer are contacted with each other due to the whirling of the retainer in driving in a case in which the wall thickness in the radial direction is equal to or less than 13.5 mm. Here, the relationship is substantially the same in a range of the contact angle between 30° and 50°. The tapered roller bearing Z is suitable for the retainer especially in which the wall thickness in the radial direction of the tapered roller bearing is equal to or less than 13.5 mm in addition to the configurations (1) and (2) described above. Further, other size in the bearing is not especially limited, however an inner diameter of the bearing is substantially less than 170 mm.

TABLE 5

| | wall thickness in radial direction (mm) | | | | | |
|---|---|---|---|---|---|---|
| | 24 | 20 | 16 | 13.5 | 12 | 8 |
| existence of contact between outer ring and retainer | no contact | no contact | no contact | contact | contact | contact |

Figure 13:
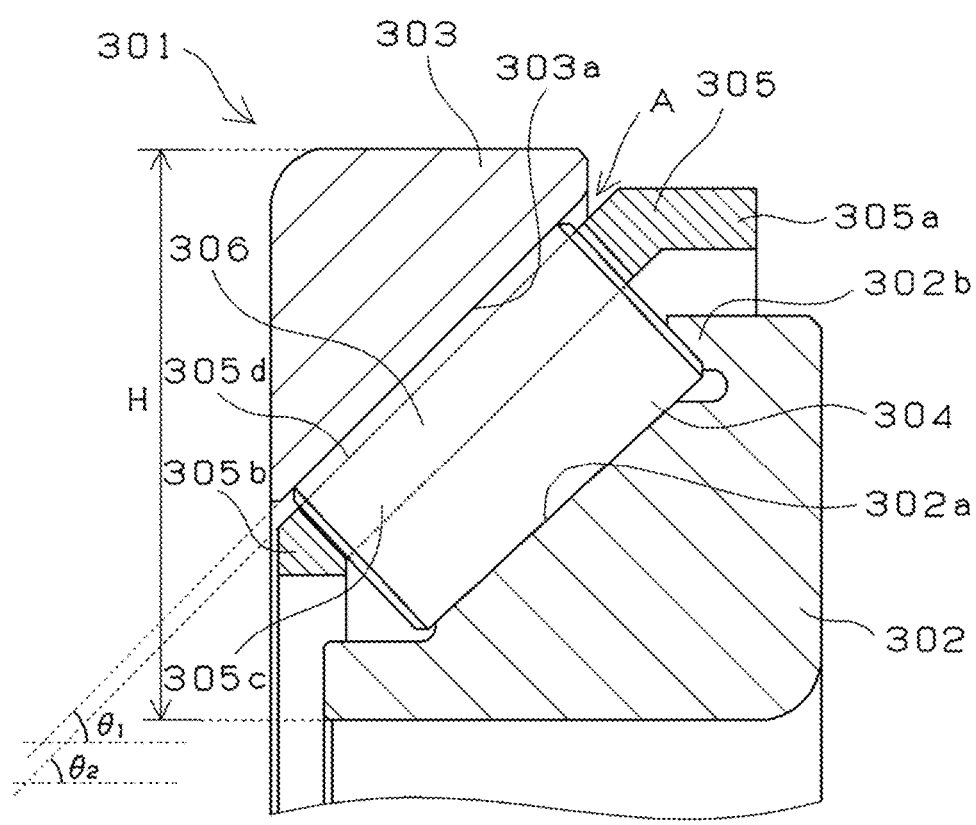
FIG. 13 is an axial cross-sectional view illustrating one example of the tapered roller bearing according to the present invention.

One example of the tapered roller bearing Z is described with reference to FIG. 13. FIG. 13 is an axial cross-sectional view of a part of the tapered roller bearing. As shown in FIG. 13, a tapered roller bearing 301 includes an inner ring 302 having a tapered raceway surface 302a on an outer circumferential surface, an outer ring 303 having a tapered raceway surface 303a on an inner circumferential surface, a plurality of tapered rollers 304 which rolls between the raceway surface 302a of the inner ring 302 and the raceway surface 303a of the outer ring 303, and a retainer 305 which retains the tapered rollers 304 in a rolling manner in a pocket portion at the same intervals in a circumferential direction. Each of the raceway surfaces is formed in a tapered shape in which a diameter formed by each of the raceway surfaces is increased or decreased along an axial direction. A contact angle of the tapered roller bearing is defined as an angle between the raceway surface 303a of the outer ring 303 and a bearing center axis, and $\theta_1$ in the figure corresponds to contact angle. The tapered roller bearing Z is applied to a tapered roller bearing having the contact angle of 30° to 50° as described above.

The retainer 305 is formed by joining a large diameter ring portion 305a and a small diameter ring portion 305b, which are formed as rib portions, by a plurality of column portions 305c. The retainer 305 houses a tapered roller 304 in a pocket portion 306 between the column portions 305c. The retainer 305 is formed as a resin retainer formed by injection molding a resin composition. The retainer 305 includes a tapered outer circumferential surface 305d formed of a surface of the column portion 305c. A clearance A is formed between the outer circumferential surface 305d and a raceway surface 303a of the outer ring 303. The retainer 305 is guided by the outer ring 303 while the outer circumferential surface 305d is contacting with the raceway surface 303a of the outer ring 303 when driven (outer ringside guide type 1). Here, in a configuration shown in FIG. 13, an inclined angle $\theta_2$ of the outer circumferential surface 305*d* of the retainer 305 is equal to an inclined angle θ₁ of the raceway surface 303*a* of the outer ring 303. That is, the outer circumferential surface 305*d* and the raceway surface 303*a* are parallel to each other, and the retainer 305 is guided by the raceway surface 303*a* of the outer ring 303 on a whole surface of the outer circumferential surface 305*d*. Here, each of the inclined angles is defined as an angle against a bearing center axis (center in the radial direction). With this, even if the clearance is small, the outer circumferential surface 305*d* of the retainer 305 and the raceway surface 303*a* of the outer ring 303 can be prevented from contacting with each other locally at the small diameter side or the like, and therefore the wear of the contact surface can be prevented and the load of the retainer can be decreased.

Figure 14:
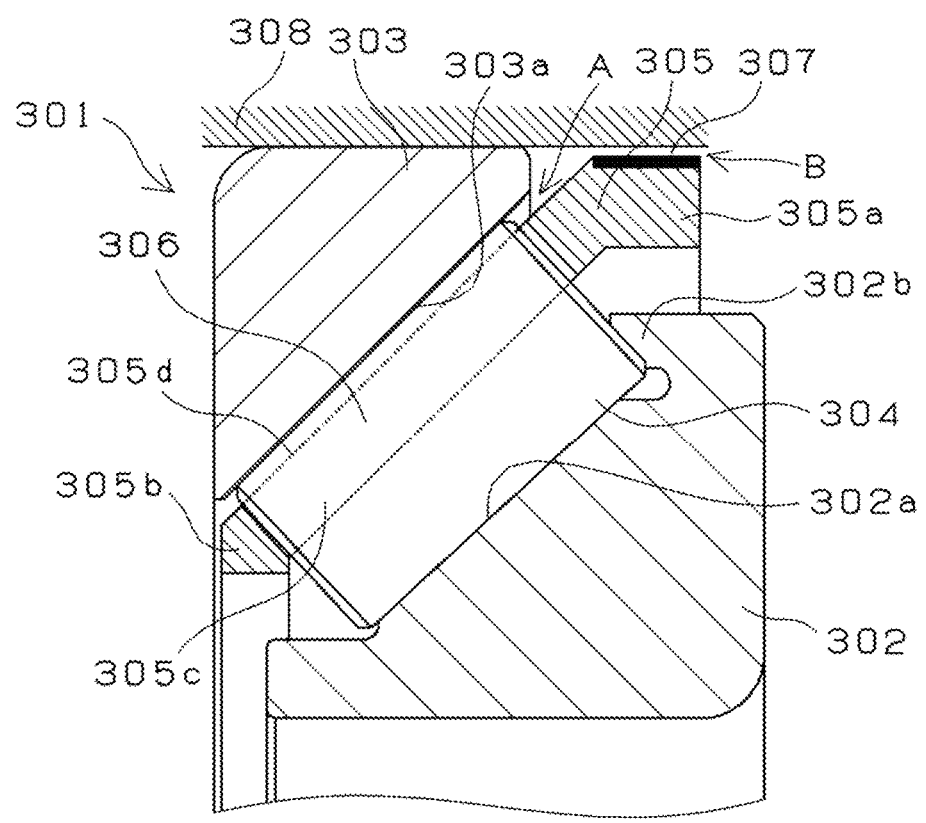
FIG. 14 is an axial cross-sectional view illustrating other example of the tapered roller bearing according to the present invention.

Other example of the tapered roller bearing Z is described with reference to FIG. 14. FIG. 14 is an axial cross-sectional view of a part of the tapered roller bearing. In a tapered roller bearing 301 having a configuration shown in FIG. 14, a retainer 305 includes a slide member 307 on an outer circumferential surface of a large diameter ring portion 305*a*. Further, a reference sign 308 in FIG. 14 indicates an outer member such as a housing arranged at an outer diameter side of the outer ring. Other configuration is similar to that of the tapered roller bearing shown in FIG. 13. A clearance B between the outer circumferential surface of the large diameter ring portion 305*a* and the outer member 308 is set to be smaller than a clearance A between the outer circumferential surface 305*d* of the retainer 305 and the raceway surface 303*a* of the outer ring 303. Thus, the retainer 305 is guided by the outer member 308 while the outer circumferential surface of the large diameter ring portion 305*a* is contacting with a surface of the outer member 308 when driven (outer ring side guide type 2). Here, in this configuration, the outer circumferential surface 305*d* of the retainer 305 and the raceway surface 303*a* of the outer ring 303 may not be parallel to each other. In a case in which they are not parallel, the clearance A is changed based on a part, however the retainer 305 is guided by the large diameter ring portion 305*a* when the minimum value of the clearance A is larger than the clearance B.

The slide member 307 is especially limited as long as it has wear resistant performance and slide performance, and therefore a member formed of known slide material such as resin material (including coating) and ceramic material may be adopted as the slide member 307. With the configuration shown in FIG. 14, the retainer 305 does not contact with the raceway surface 303*a* of the outer ring 303 directly, and therefore the wear and the crack on the raceway surface 303*a* can be prevented. Further, the slide member 307 having excellent wear resistant performance and excellent slide performance is arranged on the outer circumferential surface of the large diameter ring portion 305*a*, and thereby bearing torque can be decreased because friction force is decreased, and the load of the retainer can be decreased.

Figure 15:
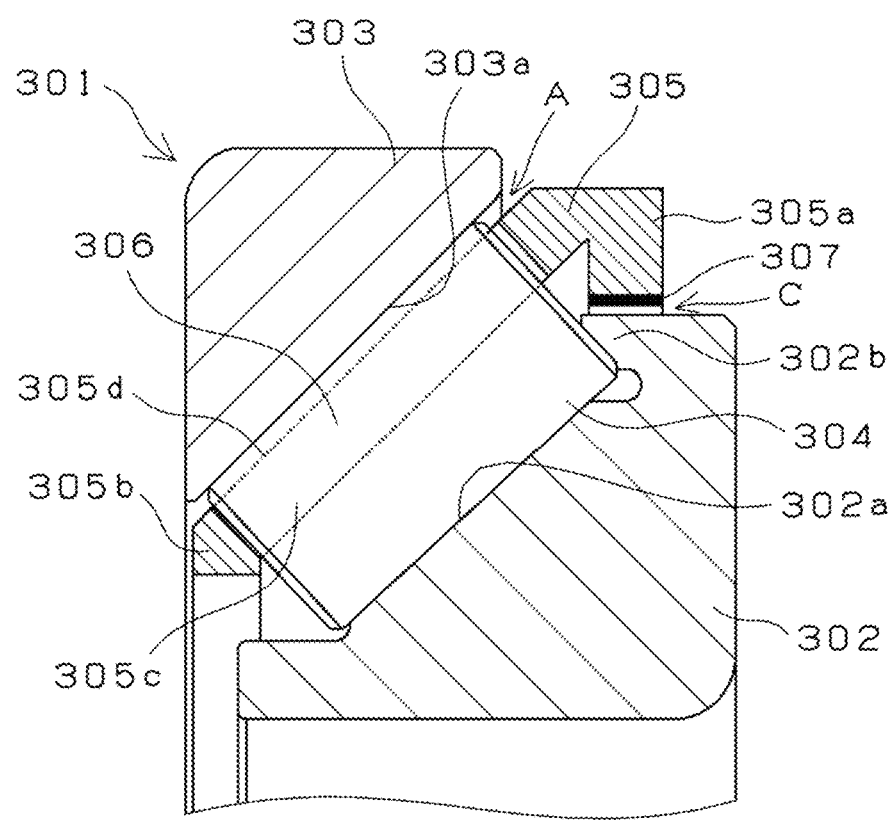
FIG. 15 is an axial cross-sectional view illustrating another example of the tapered roller bearing according to the present invention.

Another example of the tapered roller bearing Z is described with reference to FIG. 15. FIG. 15 is an axial cross-sectional view of a part of the tapered roller bearing. In a tapered bearing 301 having a configuration shown in FIG. 15, a retainer 305 includes a slide member 307 on an inner circumferential surface of a large diameter ring portion 305*a*. Other configuration is similar to that of the tapered roller bearing shown in FIG. 14. A clearance C between the inner circumferential surface of the large diameter ring portion 305*a* and the inner ring 302 is set to be smaller than a clearance A between the outer circumferential surface 305*d* of the retainer 305 and the raceway surface 303*a* of the outer ring 303. Thus, the retainer 305 is guided by the inner ring 302 while the inner circumferential surface of the large diameter ring portion 305*a* is contacting with a surface of the inner ring 302 (outer diameter portion of the large flange 302*b*) when driven (inner ring side guide type). Also in this configuration, the outer circumferential surface 305*d* of the retainer 305 and the raceway surface 303*a* of the outer ring 303 may not be parallel to each other.

With the configuration shown in FIG. 15, similar to the configuration shown in FIG. 14, the retainer 305 does not contact with the raceway surface 303*a* of the outer ring 303 directly, and therefore the wear and the crack on the raceway surface 303*a* can be prevented. Further, the slide member 307 having excellent wear resistant performance and excellent slide performance is arranged on the inner circumferential surface of the large diameter ring portion 305*a*, and thereby bearing torque can be decreased because friction force is decreased, and the load of the retainer can be decreased. Further, the material or the like of the slide member 307 is similar to that of the configuration shown in FIG. 14.

It is preferable that the tapered roller bearing Z is used by being assembled in a target portion after combining an integrated member in which the resin retainer and the tapered roller are integrated, and the inner ring and the outer ring. When the retainer and the tapered roller are integrated to form the integrated member, a roller drop-off prevention mechanism is necessary to prevent the tapered roller from dropping off from the retainer (to keep the integrated state) in assembling. For example, it is preferable that the roller drop-off prevention portion is arranged in the pocket portion of the retainer and the tapered roller is assembled in the pocket portion through elastic deformation of the drop-off prevention portion and integrated with the retainer. With this integration, the inner ring small flange can be omitted. In the tapered roller bearing 301 according to each of the configurations shown in FIG. 13 to FIG. 15, the retainer and the tapered roller are integrated, and the small flange is not arranged on the small diameter side end portion of the inner ring 302, and the large flange 302*b* is integrally formed on the large diameter side end portion of the inner ring 302. Alternatively, a construction in which both of the small flange and the large flange are omitted may be adopted.

One example of the integration of the retainer and the tapered roller is a configuration in which recess portions (thinned portion) are arranged both end surfaces of the tapered roller respectively, and protruding portions (protrusion), which engage with the recess portions respectively through elastic deformation of the protruding portions, are arranged as the drop-off prevention portion in the pocket portion of the retainer. In this configuration, the tapered roller is inserted (fitted) into the pocket portion of the retainer while elastically deforming the recess portion and the protruding portion by a hooking margin, and thereby the recess portion of the tapered roller and the protruding portion of the retainer are engaged with each other and then the retainer and the tapered roller are integrated. Further, another example of the integration is a configuration in which the tapered roller is not modified to keep a normal shape, and a claw portion as the drop-off prevention portion for the tapered roller is arranged in the pocket portion of the retainer. In this configuration, the tapered roller is assembled in the pocket portion through elastic deformation of the claw portion and then integrated with the retainer.

It is preferable that the retainer is formed of an injection molded body formed by injection molding a resin composition. The resin composition is similar to that of the tapered roller bearing according to the present invention in which the retainer fulfills the features (A) and (1) described above. Further, in a configuration in which the outer circumferential surface of the retainer is guided (the outer ring side guide type 1 described above), it is preferable that the filling material or the additive agent having excellent wear resistant performance and excellent slide performance is compounded.

As described above, examples of the embodiment of the tapered roller bearing Z are described with reference to drawings, however the tapered roller bearing Z is not limited to those.

INDUSTRIAL APPLICABILITY

The tapered roller bearing according to the present invention includes the resin retainer which can be molded by a simple molding die and can retain the tapered roller stably in integrating the tapered roller and the retainer, and thereby the tapered roller can be prevented from dropping off in assembling by a construction without a small flange, and therefore the tapered roller bearing according to the present invention can be preferably used as an industrial tapered roller bearing such as a tapered roller bearing for an industrial robot, in which a large moment load is applied and high rigidity is required.

REFERENCE SIGNS LIST

1: tapered roller bearing
2: inner ring
3: outer ring
4: tapered roller
5: retainer
6: pocket portion
7: integrated member
8: gate
9: welding position
101: tapered roller bearing
102: inner ring
103: outer ring
104: tapered roller
105: retainer
106: pocket portion
107: integrated member
108: gate
201: tapered roller bearing
202: inner ring
203: outer ring
204: tapered roller
205: retainer
206: pocket portion
301: tapered roller bearing
302: inner ring
303: outer ring
304: tapered roller
305: retainer
306: pocket portion
307: slide member
308: outer member

The invention claimed is:

1. A tapered roller bearing comprising: an inner ring having a tapered raceway surface on an outer circumferential surface; an outer ring having a tapered raceway surface on an inner circumferential surface; a plurality of tapered rollers which rolls between the raceway surface of the inner ring and the raceway surface of the outer ring; and a retainer which retains the tapered rollers in a pocket portion in a rolling manner, wherein: the retainer is formed of an injection molded body formed by injection molding a resin composition; the retainer includes (A) a large diameter ring portion, a small diameter ring portion, and column portions, each of which joins the large diameter ring portion and the small diameter ring portion, the pocket portion being arranged between the column portions adjacent to each other, or (B) column portions, a ring portion arranged at one of a small diameter side and a large diameter side of the retainer to support the column portions at the same intervals in a circumferential direction, the pocket portion being arranged between the column portions adjacent to each other, and a protrusion arranged at an end portion opposite to a side of the ring portion of the column portion and protruded toward a side of the pocket portion to support one end surface of the tapered roller; and the retainer includes (1) a molding die dividing line along an axial direction on the column portion due to the injection molding, a guide portion for the tapered roller formed of a surface, which narrows a width in a circumferential direction of an opening of the pocket portion, and arranged at a small diameter side with respect to the molding die dividing line of the column portion and at an outer diameter side of the retainer, and a claw portion for drop-off prevention of the tapered roller arranged at the small diameter side with respect to the molding die dividing line of the column portion and at an inner diameter side of the retainer, or (2) a molding die dividing line along an axial direction on the column portion due to the injection molding, a guide portion for the tapered roller formed of a surface, which narrows a width in a circumferential direction of an opening of the pocket portion, and arranged at a large diameter side with respect to the molding die dividing line of the column portion and at an inner diameter side of the retainer, and a claw portion for drop-off prevention of the tapered roller arranged at the large diameter side with respect to the molding die dividing line of the column portion and at an outer diameter side of the retainer.

2. The tapered roller bearing according to claim 1, wherein the retainer fulfills the feature (B) described above, and the ring portion is arranged at the large diameter side of the retainer.

3. The tapered roller bearing according to claim 1, wherein the inner ring has a construction without a small flange at a small diameter side end portion or a construction without a small flange at a small diameter side end portion and without a large flange at a large diameter side end portion.

4. The tapered roller bearing according to claim 1, wherein a width of the guide portion in a taper direction is equal to or more than 51% of a width of the column portion in the taper direction.

5. The tapered roller bearing according to claim 1, wherein the guide portion and the claw portion for the drop-off prevention are formed by the same molding die, and the claw portion is formed through forced extraction.

6. The tapered roller bearing according to claim 1, wherein a height h of the claw portion is set against a width $t_1$ of the claw portion in a taper direction of the column portion such that $h/t_1$ is equal to or more than 0.02, and the height h of the claw portion is set against a width $t_2$ of the claw portion in an axial direction of the retainer such that $h/t_2$ is equal to or more than 0.02.

7. The tapered roller bearing according to claim 1, wherein the guide portion includes a groove which penetrates both end portions of the guide portion in an axial direction.

8. The tapered roller bearing according to claim 7, wherein the retainer fulfills the feature (1) described above, and the groove is formed such that a width of the groove is increased from an end portion in an axial direction at an outer diameter side of the retainer toward an opposite end portion in the axial direction.

9. The tapered roller bearing according to claim 7, wherein the retainer fulfills the feature (2) described above, and the groove is formed such that a width of the groove is decreased from an end portion in an axial direction at an inner diameter side of the retainer toward an opposite end portion in the axial direction.

* * * * *